United States Patent
Sugo et al.

(10) Patent No.: US 7,709,415 B2
(45) Date of Patent: May 4, 2010

(54) METHOD FOR MANUFACTURING ACTIVATED CARBON, POLARIZABLE ELECTRODE, AND ELECTRIC DOUBLE-LAYERED CAPACITOR

(75) Inventors: Nozomu Sugo, Okayama (JP); Hideharu Iwasaki, Okayama (JP); Takanori Kitamura, Okayama (JP); Tatsuo Morotomi, Ibaraki (JP); Tsuyoshi Kowaka, Okayama (JP); Teruhiro Okada, Okayama (JP); Shushi Nishimura, Okayama (JP); Takeshi Fujino, Saitama (JP); Shigeki Oyama, Saitama (JP); Yuji Kawabuchi, Saitama (JP)

(73) Assignees: Kuraray Chemical Co., Ltd., Bizen-shi (JP); Honda Giken Kogyo Kabushiki Kaisha, Tokyo (JP)

(*) Notice: Subject to any disclaimer, the term of this patent is extended or adjusted under 35 U.S.C. 154(b) by 1591 days.

(21) Appl. No.: 10/509,087

(22) PCT Filed: Apr. 22, 2003

(86) PCT No.: PCT/JP03/05091

§ 371 (c)(1),
(2), (4) Date: Sep. 28, 2004

(87) PCT Pub. No.: WO03/089371

PCT Pub. Date: Oct. 30, 2003

(65) Prior Publication Data

US 2005/0181941 A1    Aug. 18, 2005

(30) Foreign Application Priority Data

| Apr. 22, 2002 | (JP) | 2002-119430 |
| Jun. 6, 2002 | (JP) | 2002-166260 |
| Jun. 19, 2002 | (JP) | 2002-177901 |
| Jul. 10, 2002 | (JP) | 2002-201312 |

(51) Int. Cl.
 *C01B 31/08* (2006.01)
(52) U.S. Cl. .................................................. 502/427
(58) Field of Classification Search ................. 502/427, 502/428, 429
 See application file for complete search history.

(56) References Cited

U.S. PATENT DOCUMENTS 3,539,467 A * 11/1970 Blaine et al. ................. 502/429

(Continued)

FOREIGN PATENT DOCUMENTS

CN    1334237 A    2/2002

(Continued)

OTHER PUBLICATIONS

Otowa, et al., Development of KOH Activated High Surface Area Carbon and its Application to Drinking Water Purification, Carbon 1997; 35(9): 1315-1317.*
Machine translation of JP 11-293527.*

*Primary Examiner*—Stanley S. Silverman
*Assistant Examiner*—Daniel C. McCracken
(74) *Attorney, Agent, or Firm*—Oblon, Spivak, McClelland, Maier & Neustadt, L.L.P.

(57) ABSTRACT

Activated carbon useful as polarizable electrode material for an electric double-layer capacitor can be obtained by mixing a carbonaceous material and an alkali metal hydroxide while maintaining a solid state, granulating the obtained mixture while maintaining its solid state, dehydrating the obtained granulated substance while maintaining its solid state, and subjecting the granulated dehydration product obtained in the dehydration step to an activation treatment. The preferred pressure of the granulation treatment in the granulation step is 0.01 to 300 Torr, and the preferred temperature of the granulation treatment is 90 to 140° C. The preferred pressure of the dehydration treatment in the dehydration step is 0.01 to 10 Torr, and the preferred temperature of the dehydration treatment is 200 to 400° C.

27 Claims, 1 Drawing Sheet

U.S. PATENT DOCUMENTS

| | | | | |
|---|---|---|---|---|
| 4,159,306 A | * | 6/1979 | Borst | 422/210 |
| 4,612,689 A | * | 9/1986 | de Wild et al. | 29/25.42 |
| 5,446,005 A | * | 8/1995 | Endo | 502/433 |
| 5,540,974 A | * | 7/1996 | Hoseki et al. | 428/141 |
| 5,646,815 A | * | 7/1997 | Owens et al. | 361/502 |
| 5,891,822 A | * | 4/1999 | Oyama et al. | 502/427 |
| 5,956,225 A | * | 9/1999 | Okuyama et al. | 361/502 |
| 6,118,650 A | * | 9/2000 | Maeda et al. | 361/508 |
| 6,426,865 B2 | * | 7/2002 | Kasahara et al. | 361/512 |
| 6,902,589 B1 | * | 6/2005 | Guderian et al. | 44/550 |
| 7,214,646 B1 | * | 5/2007 | Fujino et al. | 502/417 |
| 2002/0048144 A1 | * | 4/2002 | Sugo et al. | 361/502 |

FOREIGN PATENT DOCUMENTS

| | | |
|---|---|---|
| EP | 1 103 523 A2 | 5/2001 |
| EP | 1176617 | 1/2002 |
| JP | 62-61529 | 12/1987 |
| JP | 10-199767 | 7/1998 |
| JP | 11-293527 * | 10/1999 |
| JP | 11-349320 | 12/1999 |
| JP | 2001-019415 | 1/2001 |
| JP | 2002-43189 | 2/2002 |
| JP | 2002-043190 | 2/2002 |
| JP | 2002-104817 | 4/2002 |
| WO | WO 00/78138 * | 12/2000 |
| WO | WO 01/13390 * | 2/2001 |

* cited by examiner

METHOD FOR MANUFACTURING ACTIVATED CARBON, POLARIZABLE ELECTRODE, AND ELECTRIC DOUBLE-LAYERED CAPACITOR

TECHNICAL FIELD

The present invention relates to a method for manufacturing activated carbon, a polarizable electrode, and an electric double-layer capacitor, and more particularly to a method for manufacturing activated carbon whereby a carbonaceous material is subjected to alkali treatment and activated while maintaining a solid state.

BACKGROUND ART

Activated carbon having an excellent adsorption property is widely used in air cleaning, solvent recovery, flue-gas desulfurization and denitrification, many types of industrial wastewater treatment, and other applications, in addition to its use in catalyst and catalyst carrier applications. In recent years, electric double-layer capacitors are garnering attention as backup power sources and auxiliary power sources. Development is being widely conducted with attention given to the performance of activated carbon as the electrodes of an electric double-layer capacitor. Electric double-layer capacitors that use activated carbon as polarizable electrodes have excellent electrostatic capacity, so demand is growing rapidly in concert with the development of the electronics field. In addition to the miniaturization of conventional power sources for memory backup, and the like, in recent times, development of large capacity products such as those used in auxiliary power sources for motors, and the like, is being conducted.

The principles of electric double-layer capacitors have been long known, but these capacitors have only started actually being used as devices in recent years. The electrostatic capacity of electric double-layer capacitors mainly depends on the surface area of the polarizable electrodes that form the electric double layer, the resistance of the electrodes, the capacity of the electric double layer capacitor per unit surface area, and other factors. In actual application, it is important to increase the density of the electrodes themselves in order to increase the electrostatic capacity per unit volume and to decrease the volume of the electric double-layer capacitor. Conventionally, activated carbon applications for electric double-layer capacitors have included (1) activated carbon obtained by activating resin material, coconut shells, pitch, coal, and the like under acidic conditions using steam, gases or the like (See "Daiyoryo Kyapashita Gijutsu to Zairyo" (Technology and Materials for EDLC), CMC Publishing Co., 1998), (2) activated carbon obtained by a method in which materials applied in (1) described above have been activated by KOH and other highly oxidative chemicals (Japanese Patent Application Laid-open No. 10-199767, and other publications), and the like.

As described above, high electrostatic capacity and low resistance are required for electrodes used in capacitors. However, when activated carbon obtained with the method described in (1) above is used, sufficient electrostatic capacity cannot be obtained, and a bulky device is needed in order to obtain the required electrostatic capacity. According to the method disclosed in (2) described above, a somewhat high-capacity activated carbon can be obtained by activation with a highly oxidative activator such as potassium hydroxide. However, conventional alkali activation is an approach in which an alkali is heated together with a carbonaceous material to create a slurry, as disclosed in Japanese Patent Publication No. 62-61529, and handling an alkali in a dangerous melted state is inevitable. In addition to such safety problems, conventional alkali-activation technology for carbonaceous material does not take corrosion of the device into consideration at all. Therefore, it is difficult to say that this technology can be advantageously implemented on an industrial basis.

An activated carbon made from a granular isotropic pitch serving as a raw material is disclosed in Japanese Patent Application Laid-open No. 2002-104817, which describes a method for manufacturing activated carbon comprising a wetting step for pitch that wets at least the surface of a granular mixture of KOH and isotropic pitch at 200° C. or less, a solidifying step for pitch that eliminates the wetting step at 400° C. or less to create a solid state, and a heat treatment step for pitch that performs heat treatment at a temperature greater than 400° C. while maintaining the solid state. To reduce the alkali-induced corrosion of a device, the contact between the alkali and the device needs merely to be reduced as much as possible, and from this viewpoint it can be said that treatment in a solid state is a very effective method. However, according to the disclosure in the above-stated publication, it is difficult to maintain a shape and it is apparent that this method still does not solve the problem of alkali-induced corrosion in a device.

An object of the present invention is to provide a method for manufacturing activated carbon that can reduce corrosion of a device by alkali, and that has excellent stability; to provide a polarizable electrode in which this activated carbon is used; and to provide an electric double-layer capacitor in which this polarizable electrode is used.

DISCLOSURE OF THE INVENTION

As a result of thoroughgoing research, the inventors perfected the first present invention upon discovering that it is possible to greatly reduce the corrosion of an apparatus during mixing, granulation, dehydration, activation, and other steps by mixing, granulating, dehydrating, and subsequently activating a carbonaceous material and an alkali metal hydroxide while maintaining a solid state.

The second present invention was perfected upon discovering that, upon manufacture activated carbon by subjecting a carbonaceous material to an activation treatment with the aid of an alkali metal activator, not only can the objectives described above be achieved by preparing a mixture of a carbonaceous material and an alkali metal activator, and heat treating, pressure molding, and activating the mixture to manufacture activated carbon, or by preparing a mixture of the carbonaceous material and an alkali metal activator, fabricating a molded form by hot pressing, and thereafter subjecting the system to activation, but it is also possible to manufacture activated carbon with an appropriate specific surface area as an electrode for an electric double-layer capacitor in which the activation efficiency can also be improved by means of an alkali metal activator, the consumption thereof can be reduced, and the specific surface area can be controlled, thereby resulting in higher electrostatic capacity and a small quantity of impurities.

In other words, the first present invention provides a method for manufacturing activated carbon which comprises:

a mixing step for mixing a carbonaceous material and an alkali metal hydroxide while maintaining a solid state;

a granulating step for granulating the mixture obtained in the mixing step while maintaining a solid state;

a dehydrating step for dehydrating the granules obtained in the granulating step while maintaining a solid state; and an activating step for subjecting the dehydration product obtained in the dehydration step to an activation treatment to give an activated carbon.

The first present invention also provides a polarizable electrode that is obtained by mixing and molding the activated carbon obtained in the above manner, as well as at least a binder and a conductive filler, and further provides an electric double-layer capacitor in which this polarizable electrode is incorporated. The first present invention is characterized in that both the carbonaceous material and the alkali metal hydroxide are handled in a solid state, and the discovery that corrosion of a device that occurs when manufacturing an alkali-activated carbon can be greatly reduced with excellent safety by means of this manufacturing method is highly innovative.

The present inventors discovered that in the method for manufacturing activated carbon of the first present invention described above, the "alkali metal/carbon" ratio in the surface layer region of the activated carbon raw material dehydration product subjected to the activation treatment is equal to or less than predetermined times of the "alkali metal/carbon" ratio in the center portion, and perfected the invention relating to the activated carbon raw material dehydration product as described below.

In other words, the first present invention provides an activated carbon raw material dehydration product obtained by mixing a carbonaceous material and an alkali metal hydroxide while maintaining a solid state, granulating the obtained mixture while maintaining a solid state, and dehydrating the obtained granulated substance while maintaining a solid state; wherein this activated carbon raw material dehydration product satisfies Eq. (1), $$[M1/C1]/[M2/C2] \leq 2.4 \tag{1}$$

where [M1/C1] is the "alkali metal/carbon" ratio in the surface layer region thereof, and [M2/C2] is the "alkali metal/carbon" ratio in the center portion thereof.

The present inventors also discovered that the activated carbon obtained by the method for manufacturing activated carbon of the first present invention described above exhibits distinctive Raman spectrum characteristics, and perfected the invention related to the activated carbon as described below.

In other words, the first present invention also provides an activated carbon obtained by activating a carbonaceous material with an alkali metal hydroxide, wherein the activated carbon is such that the standard deviations of the relative peak strengths of the graphite D band, the amorphous G band, and the graphite G band in relation to the peak strength of the amorphous D band are 0.05 or less, assuming that the peak strength of the amorphous D band in the Raman spectrum is set to 1 when 20 observation points or more are measured.

The second present invention provides a method for manufacturing activated carbon by subjecting a carbonaceous material to an activation treatment with the aid of an alkali metal activator, wherein this manufacturing method comprises a step for preparing a mixture of a carbonaceous material and an alkali metal activator, a step for heat treating the mixture, a step for using the mixture to obtain a molded product by pressure molding, and a step for using the molded product to perform the heating process of the activation treatment.

The second present invention also provides a method for manufacturing activated carbon by subjecting a carbonaceous material to an activation treatment with the aid of an alkali metal activator, wherein this manufacturing method comprises a step for preparing a mixture of a carbonaceous material and an alkali metal activator, a step for using the mixture to obtain a molded product by hot pressing, and a step for using the molded product to perform the heating process of the activation treatment.

BEST MODE FOR CARRYING OUT THE INVENTION

Figure 1:
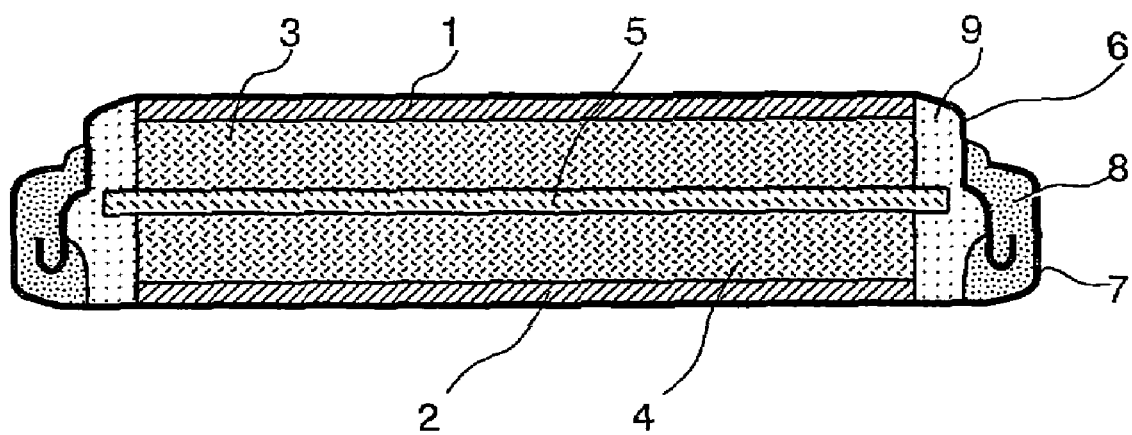
FIG. 1 is a cross-sectional schematic view showing an example of an electric double-layer capacitor.

The first present invention is described below.

The method for manufacturing the activated carbon of the first present invention has the following steps:

a mixing step for mixing a carbonaceous material and an alkali metal hydroxide while maintaining a solid state;

a granulating step for granulating the mixture obtained in the mixing step while maintaining its solid state;

a dehydrating step for dehydrating the granules obtained in the granulating step while maintaining its solid state; and an activating step for subjecting the dehydration product obtained in the dehydration step to an activation treatment to give an activated carbon.

The principal feature of the manufacturing method of the first present invention is the working of all of the steps including the mixing step, granulating step, dehydrating step, and activating step while maintaining a solid state. One method of maintaining the solid state in each of these steps is to conduct the treatments at relatively low temperatures in comparison with conventional manufacturing methods. The mixture of both the carbonaceous material and alkali metal hydroxide can be subjected to the activation treatment while maintaining a solid state with the aid of these low temperature treatments, in other words, without the conventionally-required handling of melted alkali metal hydroxide, resulting in a manufacturing method for activated carbon that reduces the corrosion of the equipment used in these steps, especially the equipment used during activation, and that is significantly superior from the point of safety as well. As long as the solid state is maintained, the solid state referred to in the present invention may be a wetted state to such an extent that the surface of the mixture does not adhere.

The raw materials that are used in the mixing step in the first present invention are described below.

The carbonaceous material used in the first present invention is not particularly limited as long as the material forms activated carbon by means of activation, and may be widely selected from plants, minerals, natural substances, synthetic substances, and the like. Examples of plant-derived carbonaceous material more specifically include wood, charcoal, coconut shells, and other fruit shells. Examples of mineral-derived carbonaceous material include petroleum and/or coal pitch, petroleum coke, coal coke, pitch, coal, and coke. Examples of natural substances include cotton, hemp, and other natural fibers; rayon, viscose rayon, and other regenerated fibers; and acetate, triacetate, and other semisynthetic fibers. Examples of synthetic materials include nylon, and other polyamides; vinylon, and other polyvinyl alcohols; polyethylene, polypropylene and other polyolefins; and polyurethane, phenolic resin, and the like.

Examples of preferred carbonaceous materials that may be used as starting materials for an activated carbon include easily graphitizable carbonaceous material, for example, petroleum coke, coal coke, pitch, coal, coke, petroleum pitch, mesophase pitch, polyvinyl chloride, polyimide, polyacrylonitrile.

Among these, mesophase pitch is preferable, and carbon fiber based on mesophase pitch is more preferable as the carbonaceous material. A pitch containing 50 vol % or more, or preferably 80 vol % or more, of an optically anisotropic phase is desirable from the viewpoint of high conductivity.

The shape of the carbonaceous material is not particularly limited. A granular form, powder form, fiber form, sheet form, or other form may be used.

Examples of carbonaceous materials in a fiber or sheet form include woven or nonwoven fabric, film, felt, or other materials in the form of a sheet composed of cotton or other natural cellulose fiber; viscose rayon, polynosic rayon, or other regenerated cellulose fiber; isotropic pitch fiber, mesophase pitch fiber, or other pitch fiber; or pulp fiber, polyvinyl alcohol fiber, ethylene vinyl alcohol fiber, phenol fiber, or other synthetic fiber.

In the first present invention, a carbonaceous material that is milled is preferably used, but one having a maximum length of 500 μm or less in the direction of the major axis is preferably used, and one that is 200 μm or less is more preferably used to effectively advance the activation treatment described below. The maximum length in the direction of the major axis may be confirmed by observing an electron microscope photograph of the pulverized powder of carbonaceous material extracted at random, for example. Pulverization may be performed by means of well-known pulverizers such as cone crushers, double roll crushers, disk crushers, rotary crushers, ball mills, centrifugal roll mills, ring rolling mills, and centrifugal ball mills.

Examples of the alkali metal hydroxide used in the first present invention include, for example, granular forms of sodium hydroxide, potassium hydroxide, lithium hydroxide, and cesium hydroxide, or mixtures of these. Sodium hydroxide and/or potassium hydroxide are preferably used to obtain a carbonaceous material having large electrostatic capacity. Common commercially available products may be used as these alkali metal hydroxides.

From the viewpoint of the moisture content, it is preferable for the moisture content of such an alkali metal hydroxide to be 1 to 20 wt %, and a content of 1 to 10 wt % is even more preferred in view of handling.

In the first present invention, it is preferable to use a pulverized alkali metal hydroxide, and from the viewpoint of the average size of the particles, such an alkali metal hydroxide preferably has an average particle diameter of 1 mm or less. The same pulverizers used to pulverize the carbonaceous material may also be used to pulverize the alkali metal hydroxide. In the particular case that the alkali metal hydroxide takes the form of a bulk, such as a block, the block need merely be pulverized with a pulverizer such as those described above to form granules. Here, granules broadly refer to common fine granular states such as spherical shapes, fractured shapes, and powder shapes.

Each step of the method of manufacturing the activated carbon of the first present invention is subsequently described.

(Mixing Step)

First, the carbonaceous material and the alkali metal hydroxide are mixed while maintaining a solid state. At this time, the system should be sufficiently mixed so as to achieve as much uniformity as possible. It should also be noted here that a solid state refers to the mixture in a solid state. The mixer used in this step is not particularly limited, but well-known rotary container-type mixers, fixed container-type mixers, or the like may be used. A rotary container-type mixer is preferred in that a uniform mixing can be achieved.

An alkali metal hydroxide is normally hygroscopic, so the components are preferably mixed under a dry air, dry nitrogen, or other dry environment to avoid moisture absorption. Nickel is preferably used as the mixer material to reduce corrosion as much as possible.

The mixing temperature is not particularly limited, but mixing at room temperature is normally sufficient. If the quantity of alkali metal hydroxide is too small, then the properties of the objective carbon material become variable because the activation treatment is insufficient and nonuniform, and if the quantity is conversely too large, not only is the treatment uneconomical, but activation also advances too far. As a result, while the electrostatic capacity of carbonaceous material per unit weight tends to become higher, the electrostatic capacity of the carbonaceous material per unit volume may decrease. The quantity of alkali metal hydroxide may therefore be one or more parts by weight per one part of the carbonaceous material, preferably 1.2 to 4 parts by weight, more preferably 1.3 to 3 parts by weight per one part by weight of the carbonaceous material.

When mixing the carbonaceous material and the alkali metal hydroxide in this mixing step, the carbonaceous material is preferably added to the alkali metal hydroxide in advance and finely pulverized, and the carbonaceous material and the alkali metal hydroxide are mixed thereafter. In this case, if the quantity of the carbonaceous material added to the alkali metal hydroxide in advance is too small, then insufficient effect is manifested, and if the quantity is too large, then the ability of the system to be pulverized is lowered, so preferably 0.5 to 10 wt % of carbonaceous material may be added to the alkali metal hydroxide, and more preferably 1 to 5 wt % may be added. By mixing and pulverizing in this manner, a bridge cannot be formed between the alkali metal hydroxide particles, so the mixing of carbonaceous material and alkali metal hydroxide can be improved and a uniform mixture can be obtained, with little variation in the composition ratio of the alkali metal hydroxide and the carbonaceous material in the granulation and/or dehydration product, which is prepared in the granulating and/or dehydrating steps described hereinafter. An activated carbon with excellent electrostatic capacity, little activation nonuniformity, and no variability in performance can be obtained from such a mixture.

The alkali metal hydroxide to which the carbonaceous material has been added in advance is finely pulverized in accordance with a batch or continuous process using a ball mill, a dynamic mill, or other well-known pulverizing apparatus. An alkali metal hydroxide is commonly hydroscopic and deliquescent, so pulverizing may preferably be performed under an environment of nitrogen, helium, argon, or another inert gas that does not contain moisture or low dewpoint air at about −10° C. or less. The pulverizing conditions depend on the kind of alkali metal hydroxide, the flake particle size, the kind of carbonaceous material, the shape, the pulverizing apparatus, and other factors, so one unique set of conditions cannot be determined, but when the alkali metal hydroxide is potassium hydroxide flakes, and the carbonaceous material is a mesophase pitch carbon fiber (a cylindrical shape with a diameter of 13 μm and a length of 20 μm), for example, a uniform pulverized product with excellent fluidity and an average particle diameter of about 10 μm can be obtained without bridge formation when a ball mill composed of nylon resin and filled with an aluminum ball is operated for one to two hours at a circumferential speed of about 1 m/sec.

(Granulating Step)

Next, the mixture obtained in the mixing step is preferably granulated in spherical shapes while maintaining the solid state thereof. Here, because the granulation effect is not manifested when the temperature of the granulation treatment is too low, the temperature may preferably be 80° C. or higher while maintaining the required solid state as the granulation treatment condition. The pressure of the granulation treatment at this time is not particularly limited. More preferable conditions for the granulation treatment are a reduced pressure of 0.01 to 300 Torr for the granulation treatment pressure, and 90 to 140° C. for the granulation treatment temperature. The temperature rise rate until achieving such a granulation treatment temperature is not particularly limited, but may be conducted at a rate of about 0.1 to 10° C./minute.

The granulation treatment may be conducted under an environment of inert gas such as nitrogen. The granulation may be performed with the mixers described above, but if the granulation product is too large, then dehydration nonuniformity occur, activation does not reach sufficiently deep into the mixture, and activation defects may occur, so the maximum diameter is preferably 50 mm or less. Conversely, if the granulation product is too small, then powdering occurs and the product easily adheres to the wall of the container and becomes difficult to remove from the container, so the maximum diameter is more preferably 1 mm to 30 mm. The granules of the granulation product may be adjusted by the rotation of the mixer used.

(Dehydration Step)

The granulation product obtained in the granulation step is subjected to a dehydration treatment while maintaining the solid state thereof to obtain a granulated dehydration product (in other words, a dehydrated granulation product). The dehydration treatment may be performed with the same mixers described above, but a separate reactor may also be used. Here, assuming that a solid state is maintained, the temperature of the dehydration treatment is preferably kept at 200° C. or higher as a condition for the dehydration treatment because dehydration tends to be insufficient if the dehydration temperature is too low, and activation occurs before sufficient dehydration is performed if the temperature is too high. More preferable conditions for the dehydration treatment are a reduced pressure of 0.01 to 10 Torr for the dehydration treatment pressure, and 200° C. to 400° C. for the dehydration treatment temperature.

The temperature rise rate is preferably adjusted to maintain the solid state. The temperature rise rate depends on the amount of reduced pressure, but a rate of about 0.1 to 10° C./minute is preferable, and 0.2 to 5° C./minute is more preferable. The dehydration treatment may be conducted under a flow of inert gas such as nitrogen.

Here, the dehydration treatment is preferably conducted so as to satisfy Eq. (2) below, which defines the correlation between the temperature rise rate and the pressure inside the treatment system at which dehydration can be performed while maintaining the solid state during the dehydration treatment in the first present invention.

$$Pv < 15 \quad (2)$$

In the equation, P is the pressure (Torr) during the dehydration treatment, and v is the temperature rise rate (° C./minute) during the dehydration treatment. The reason why the dehydration treatment is conducted so as to satisfy Eq. (2) is as below.

Namely, if the temperature of the mixture (hereinafter simply referred to as "raw material") of the pulverized carbonaceous material and the granulated alkali metal hydroxide rises under a small quantity of air or inert gas flow at normal pressure, the alkali metal hydroxide in the raw material melts at a temperature that corresponds to the moisture content of the raw material, and the raw material forms a slurry or a liquid. For example, if the temperature is allowed to rise under atmospheric pressure, the raw material enters a wetted state at about 250° C., the particles begin to mutually adhere, and eventually the system becomes a slurry. Such a condition must be avoided to the extent possible from the viewpoint of alkali corrosion of the device. When the dehydration treatment is conducted so as to satisfy Eq. (2), water contained in the raw material can be released as water vapor while maintaining the solid state of the raw material, the moisture content therein can be reduced, and, as a result, the dehydration treatment can be performed while maintaining the solid state.

More specifically, if the temperature is allowed to rise to 300° C. at a rate of 0.8° C./minute, for example, dehydration can be conducted until the moisture content reaches 0% while maintaining the solid state if the pressure inside the system is kept to 10 Torr or less. If the temperature is allowed to rise to 300° C. at a rate of 2.0° C./minute, dehydration can be conducted until the moisture content reaches 0% while maintaining the solid state if the pressure inside the system is kept to 3 Torr or less. If the pressure inside the system is 10 Torr when the temperature rise rate is 2.0° C./minute, the raw material enters a slurry state at 250° C., the particles begin to mutually adhere, and the solid state may not be capable of being maintained.

The temperature rise rate in the dehydration treatment is not limited to a uniform temperature raise, but the pressure inside the system and the temperature rise rate may be freely modified as long as the relationship noted above is satisfied. It is also possible to reinitiate a temperature rise after holding a fixed temperature during dehydration, or to reinitiate dehydration after once the temperature has been lowered.

If the temperature during the dehydration treatment is too low, then dehydration tends to be insufficient, as described above, and if too high, then activation occurs before dehydration is sufficiently completed, and hydrogen, methane, or other combustible gases are generated. The temperature is therefore preferably 200° C. to 400° C., but when handling combustible gas under reduced pressure conditions, the temperature during the dehydration treatment is preferably kept at 350° C. or less under reduced pressure in order to prevent ignition, explosion, or the like due to oxygen leaking from outside the system. If the temperature is allowed to rise greater than this, then switching over to increasing the temperature at normal pressure is preferred from the standpoint of safety. With respect to the end temperature under reduced pressure, if the moisture content reaches 0%, then there is no particular limit, but when using mesophase pitch carbon fiber as the carbonaceous material, then it is preferable to perform operations under reduced pressure up to 300° C.

The granulation and dehydration steps are preferably carried out so as to satisfy Eq. (3) below, $$[A1/B1] \geq [A2/B2] \quad (3)$$

where A1 (N) is the crushing strength of the granulation product obtained in the granulation step described above, B1 (cm) is the diameter of the granulation product, A2 (N) is the crushing strength of the dehydration product obtained in the dehydration step, and B2 (cm) is the diameter of the dehydration product. Activation nonuniformity between the particles of activated carbon can thereby be reduced. Specific treatment conditions that satisfy Eq. (3) can be set by appropriately adjusting the granulation treatment and dehydration treatment conditions. Here, the crushing strength (N: newtons) of the granulation product and/or the dehydration product is the value measured by tightly holding the granulation or dehydration product in the direction of the minor axis with a compression jig, and compressing the system at a compression speed of 10 mm/minute from such a state with the aid of a commercially available dynamic strength measuring apparatus capable of measuring crushing strength (Autograph AG-5000B manufactured by Shimadzu Corp., for example). The diameter of the granulation or dehydration product is the length of the minor axis (cm) when tightly held with the compression jig in the direction of the minor axis of the granulation or dehydration product. It is preferable to use the average value of at least 20 granulation or dehydration products for the numerical value of the [A1/B1] ratio or [A2/B2] ratio.

The dehydration product obtained in the main dehydration step by way of the mixing and granulation steps described above; namely, the dehydration product obtained by mixing the carbonaceous material and the alkali metal hydroxide while maintaining a solid state, granulating the obtained mixture while maintaining the solid state thereof, and dehydrating the obtained granulation product while maintaining the solid state thereof, is useful as an activated carbon raw material. In particular, the dehydration product that satisfies the Eq. (1) below $$[M1/C1]/[M2/C2] \leq 2.4 \quad (1)$$

where [M1/C1] is the alkali metal/carbon ratio in the surface layer region of the dehydration product, and [M2/C2] is the alkali metal/carbon ratio in the center portion of the dehydration product, can provide a stable-quality activated carbon in which activation defects between particles are small, so the product is very useful as an activated carbon raw material dehydration product. The alkali metal/carbon ratio in the surface layer region and the center portion of the dehydration product is a value obtained by bisecting the dehydration product at substantially the center portion, finding the potassium/carbon ratio by performing an X-ray analysis on both the surface layer region and the center portion with a scanning electron microscope, and dividing the potassium/carbon ratio [M1/C1] in the surface layer region by the potassium/carbon ratio [M2/C2] in the center portion. Here, the surface layer region refers to the portion between 50 μm and 550 μm from the surface of the dehydration product toward the center portion thereof, and the center portion refers to the portion of within 500 μm or less from the center of the molded product. It is preferable to use the average value of at least 20 granulation or dehydration products for the numerical value of the alkali metal/carbon ratio.

(Activation Step)

Activated carbon is subsequently obtained by subjecting the dehydration product obtained in the dehydration step to an activation treatment. Here, the activation treatment can be performed continuously or in a batch in an inert gas such as nitrogen or argon. If the temperature of the activation treatment is too high, the surface area of the activated carbon is increased, but the electrostatic capacity is reduced when fashioned into an electric double-layer capacitor, and because the metallic potassium vaporized by the activation treatment evaporates, the danger is significantly increased. If the temperature of the activation treatment is too low, the fine structure that is to be gasified and removed from the system by the activation treatment is not removed, so the electric resistance increases when the product is used as an electrode material, for example. The temperature of the activation treatment is therefore preferably 500° C. to 900° C., and more preferably 550° C. to 800° C.

When performing the activation treatment, the temperature must rise to a predetermined activation treatment temperature (holding temperature), but a rapid temperature rise is not preferred from the point of maintaining the granular shape of the hydration product, and a temperature rise that is too slow may result in inadequate performance as an electric double-layer capacitor, so it is normally preferable to adopt a temperature rise rate of 50° C. to 1,000° C./hour. It is desirable to further dry the granular dehydration product (in other words, the dehydrated granulation product) by exposing the system to a flow of inert gas such as nitrogen or argon prior to the activation treatment.

When sodium hydroxide or potassium hydroxide is used as the alkali metal hydroxide, the activation treatment temperatures are each in the vicinity of 650° C. or 730° C., and the electrostatic capacity of the obtained activated carbon increases critically. The temperature rise rate in the activation treatment in this case is preferably about 4° C. per minute beginning from room temperature.

Specific examples of the temperature rise rate to the predetermined activation temperature (holding temperature) and the holding time at the predetermined activation temperature in the activation step include a rate at which the temperature is allowed to rise to 200 to 600° C. at preferably 5° C./minute or less, and more preferably 2° C./minute or less; an activation treatment temperature (holding temperature) of 700° C. or more, and more preferably 700 to 850° C.; and a holding time of preferably 0.5 to 8 hours, and more preferably 1 to 6 hours.

A conventional rotary type, fluid type, moving type, or other type of activation device may be adopted as the activation device. A material having nickel as a main component is preferably used as the material of the activation device from the viewpoint of reducing corrosion as much as possible. From the viewpoint of industrial dominance with regard to the activation device and the treatment method, a rotary kiln from the category described above is preferred as the activation device, and an externally heated rotary kiln is more preferred; and a continuous-type treatment method is preferred from the aspects of productivity and the performance of the activated carbon.

When exposing the inside of the activation device to a flow of inert gas during the activation treatment, the inert gas inside the activation device is normally circulated at a flow rate of 0.01 cm/minute or more, and 0.1 cm/minute or more is preferred, though this varies according to the reaction method used.

The obtained treatment product is cooled after the activation treatment is complete. Cooling may be performed under a flow of inert gas such as nitrogen or argon in order to avoid combustion of the treatment product (activated carbon). The objective activated carbon may be subsequently obtained by washing the treatment product with water to remove the alkali metal portion, and drying the product by an ordinary method.

As described above, the mixture of carbonaceous material and alkali metal hydroxide is entirely treated while maintaining the solid state. Thus, the mixture is consistently treated to activation without melting, so oxidative corrosion can be markedly reduced.

At least the activation step of the manufacturing method of the first present invention is preferably conducted under a flow of inert gas, as described above. This inert gas functions as a carrier of the alkali metal in the form of vapor generated from the activated treatment product by heat during the activation treatment, but the alkali metal in this vapor form is highly reactive and is greatly susceptible to the danger of ignition or explosion. As a result, this metal in vapor form is preferably circulated through the activation system together with the inert gas as a carrier thereof, and allowed to adhere to the sorptive carbon material to deactivate the vapor in the present invention. This approach resolves the problem of ignition or other unwanted combustion even if the sorptive carbon material and the activated carbon material are released to the atmosphere after sorption. Here, sorption widely refers to collecting, capturing, or the like, including adsorption.

During sorption, the inert gas containing alkali metal in the form of vapor is preferably brought into contact with the sorptive carbon material for 0.5 seconds or more, and more preferably 1.0 seconds or more. If the sorption time is less than 0.5 seconds, the deactivation of the alkali metal in vapor form through sorption to the sorptive carbon material is insufficient, and the alkali metal tends to pass to the exterior of the system as vapor without being sorbed by the sorptive carbon material.

Also during sorption, the temperature of the sorptive carbon material is preferably set to 300 to 800° C., and more preferably to 400 to 700° C. A temperature less than 300° C. results in insufficient deactivation of the alkali metal by the sorptive carbon material, and a temperature higher than 800° C. results in the sorptive carbon material itself being activated and deteriorated, so the strength may consequently be reduced and the product may become more susceptible to fine powdering or other undesirable effects.

Also during sorption, if the linear velocity of the inert gas is too high then the alkali metal in vapor form may blow through without making contact with the surface of the sorptive carbon material, and if too low the concentration of the alkali metal in vapor form may rise. As a result, deactivation tends to be insufficient due to residual alkali metal vapor that is not able to make contact with the carbon material, or due to deposition or the like on the sorbed alkali metal, so the linear velocity of the inert gas is preferably set to between 1.0 and 10.0 mm/second.

Examples of carbon materials for sorption that can sorb an alkali metal in vapor form during sorption include activated carbon, carbon fiber mat, silica gel, alumina, ceramic, ceramic wool, and a composite product of activated carbon with ceramic wool, but among these, activated carbon is preferred. A wide range of examples of carbonaceous materials that yield activated carbon by activation with conventional activation methods includes coconut shells, petroleum pitch, coal pitch, phenolic resin, mesophase pitch carbon fiber, and other carbonaceous materials. The shape of the carbonaceous material is not particularly limited. A granular form, powder form, fiber form, sheet form, or other form may be used. It is preferable to use activated carbons that have a large specific surface area, and that contain a greater quantity of aromatic ring edge structures and functional groups for reacting with alkali metal. These activated carbons are normally used independently, but a plurality of types may be mixed and used.

The quantity of sorptive carbon material to be used depends on the type and shape of the carbonaceous material, on the activation method, the loading method, treatment temperature, and other factors, but if the amount is too small then the breakthrough point of the alkali metal sorption is exceeded, deactivation due to reaction with the alkali metal does not complete, the alkali metal is left behind, and ignition or other danger remains; and if too much is used the process is uneconomical, so the metal portion in the alkali metal hydroxide is preferably a weight multiple of 0.1 to 3.0, and more preferably a weight multiple of 0.2 to 2.0.

Once the heat treatment as an activation treatment is completed, the sorptive carbon material to which alkali metal has been sorbed may be reused as sorptive carbon material by washing and drying. When the sorptive carbon material and the carbonaceous material, which is the raw material for manufacturing the objective activated carbon material, are the same, the sorptive carbon material that was used to sorb alkali metal may also serve as the raw material for obtaining the objective activated carbon material. The alkali metal sorbed to the sorptive carbon material is eluted as alkali metal hydroxide in an aqueous phase when the sorptive carbon material is washed with water, so the alkali metal can be recovered as alkali metal hydroxide from the aqueous solution thereof. Activation nonuniformity stemming from a nonuniform mixture condition and heat history observed when the mixture of carbonaceous material and alkali metal hydroxide is directly carried into the activation treatment can be prevented, and deactivation with the carbon material of the generated alkali metal in vapor form can be conducted under stable conditions. An industrially advantageous manufacturing method for activated carbon can therefore be obtained by allowing the metal in vapor form and the inert gas that functions as a carrier thereof to flow through the activation system, sorbed to the sorptive carbon material, and deactivated.

As described above, according to the manufacturing method of the first present invention, not only can industrially advantageous alkali activation be performed because corrosion of the device itself is minimal, but the metal portion contained in the activated carbon can also be markedly reduced, preferably to 300 ppm or less. In particular, the iron, copper, and nickel contents can each be reduced to 20 ppm or less, and more preferably to 10 ppm or less. An electric double-layer capacitor having excellent self-discharge characteristics can be manufactured by using polarizable electrodes obtained by molding this activated carbon.

Distinctive Raman spectrum characteristics are exhibited when an easily graphitizable carbonaceous material is used as the carbonaceous material. That is to say, this activated carbon is such that the standard deviations of the relative peak strengths of the graphite D band, the amorphous G band, and the graphite G band in relation to the peak strength of the amorphous D band are 0.05 or less, assuming that the peak strength of the amorphous D band in the Raman spectrum is set to 1 when 20 observation points or more are measured. An activated carbon with a structurally stable quality is achieved by minimizing the standard deviations in such a manner.

Here, the peak strength of the amorphous D band, the peak strength of the graphite D band, the peak strength of the amorphous G band, and the peak strength of the graphite G band are the peak strengths in the Raman spectrum obtained by curve fitting the peak in the vicinity of $1,250 \text{ cm}^{-1}$, the peak in the vicinity of $1,350 \text{ cm}^{-1}$, the peak in the vicinity of $1,550 \text{ cm}^{-1}$, and the peak in the vicinity of $1,600 \text{ cm}^{-1}$, respectively, with a Gaussian function and thereby dividing these respectively into four bands, the peak indicating the amorphous D band, the peak indicating the graphite D band, the peak indicating the amorphous G band, and the peak indicating the graphite G band, where the Raman spectrum is measured using an $Nd^{3+}$:YAG laser with a wavelength of 532 nm for the excitation light, and a charge coupled device (CCD) for the detector.

In such a polarizable electrode, if the electrode density is too small, then the electrode surface area becomes larger and the electric double layer capacitor become too bulky, so the density is preferably 0.80 g/cc or higher.

It is possible to apply conventional methods to manufacture a polarizable electrode for an electric double-layer capacitor using the activated carbon obtained with the manufacturing method of the first present invention. Materials known as binders, such as commercially available polyvinylidene fluoride, and polytetrafluoroethylene, for example, may be added and kneaded as required up to about several percent, and thereafter placed in a mold, pressure molded, calendered into a sheet, and punched out into a required shape to fashion an electrode. In this process, alcohol, N-methyl pyrrolidone, or other organic compounds; water, or other solvents; dispersants; and various additives may be used as required. Heat treatment may be performed in the process. Temperatures higher than that required not only cause the binder component to deteriorate, but also affect the surface structure properties, such as the specific surface area, for example, of the activated carbon component, so it is apparent that the temperature conditions thereof must be considered.

When molding, conductive substances such carbon black, Ketjen black, or other conductive carbons may be added to reduce the resistance of the electrode. This is effective in reducing the internal resistance of the polarizable electrode, and in making the volume of the electrode smaller. In addition to a sheet electrode such as that described above, a kneaded product may be applied to a collector to fashion a coated electrode.

The polarizable electrode described above is useful as an electrode for an electric double layer capacitor such as that shown in FIG. 1 (a schematic cross-sectional view). Other than using the polarizable electrode according to the present invention, the constituent components comprising the capacitor in FIG. 1 may have the same configuration as a conventional electric double-layer capacitor, and in the figure, for example, 1 and 2 are collector members comprising aluminum or the like; 3 and 4 are polarizable electrodes comprising the activated carbon of the present invention; 5 is a separator comprising a polypropylene unwoven fabric or the like; 8 is a gasket comprising polypropylene, polyethylene, polyamide, polyamide imide, polybutylene, or the like; and 6 and 7 are respectively a cover and a case comprising stainless steel or the like.

An electrolytic solution 9 in which tetraethylammonium tetrafluoroborate, tetramethylammonium tetrafluoroborate, triethylmethylammonium tetrafluoroborate, or another conventional electrolyte is dissolved in a solvent such as tetrahydrofuran or another ether; dimethyl carbonate, diethyl carbonate, ethylene carbonate, propylene carbonate, dimethyl carbonate, diethyl carbonate, or another carbonate; acetonitrile or another nitrile; $\gamma$-butyrolactone, $\alpha$-methyl-$\gamma$-butyrolactone, or another lactone; dimethylsulfoxide or another sulfoxide; or dimethylformamide or another amide, must be sealed within the case 7 to allow the system to function as an electric double-layer capacitor.

The electric double-layer capacitor having the configuration shown in FIG. 1 uses the activated carbon of the first present invention, so the electrostatic capacity can be set to 30 F/cc or more. The retention rate of the electrostatic capacity can be maintained at 90% or more even after repeating charging and discharging at least 500 times, the charging and discharging consisting of charging with a constant current and discharging with a constant current.

The second present invention is subsequently described.

The method for manufacturing activated carbon of the second present invention entails manufacturing activated carbon by subjecting a carbonaceous material to an activation treatment with the aid of an alkali metal activator, this manufacturing method having a step for preparing a mixture of a carbonaceous material and an alkali metal activator, a step for heat treating the mixture, a step for using the mixture to obtain a molded product by pressure molding, and a step for using the molded product to perform the heating process of the activation treatment. The method for manufacturing activated carbon of the second present invention alternatively has a step for preparing a mixture of a carbonaceous material and an alkali metal activator, a step for using the mixture to obtain a molded product by hot pressing, and a step for using the molded product to perform the heating process of the activation treatment. Thus, the second present invention improves the activation efficiency by means of the alkali metal activator, reduces the quantity thereof consumed, makes control of the specific surface area possible, and thereby provides an activated carbon that has a high electrostatic capacity, that is devoid of impurities, and that additionally has a suitable specific surface area as an electrode for an electric double-layer capacitor.

In the second present invention, a molded product is formed before the activation treatment. In this molded product, the alkali metal-containing activator is in close contact with, and is uniformly dispersed in, the carbonaceous material, and the thermal conductivity is also high, so the efficiency of activation by means of the alkali metal activator can be improved, and the quantity of the activator consumed can be reduced from conventional methods. The shape of the molded product can also be maintained substantially completely or in a slightly broken down state until the completion of the heating process, so it is possible to retain substantially the whole quantity of alkali metal therein.

According to the second present invention, it is therefore possible to obtain activated carbon that is sufficiently activated by a small quantity of alkali metal-containing activator, and that has high electrostatic capacity density and a small quantity of impurities; and also to obtain activated carbon in which the specific surface area can be controlled by means of the amount of alkali metal, and that is provided with a suitable specific surface area as an electrode for an electric double layer capacitor. Furthermore, the elution from the molded product of the alkali metal-containing activator is prevented or decreased, so it is possible to prevent or inhibit the corrosion of the reactor, and to improve the durability thereof.

The carbonaceous material described in the first present invention may be used as the carbonaceous material in the second present invention. In addition to the alkali metal hydroxide described in the first present invention, an alkali metal may also be used alone as the alkali metal activator. The method of manufacturing activated carbon of the second present invention is described step-by-step below.

Mixture Preparation Step

The carbonaceous material and the alkali metal activator both are preferably used in a powder form, but the moisture content of both of these should be kept very low in order to inhibit melting of the activator. A ball mill, jet mill, high-speed rotating mill, or the like may be used as the pulverizer for obtaining powders of these. The average particle diameter $d_1$ of the powder of the carbonaceous material is preferably set to 1 μm or more and 50 μm or less, and the average particle diameter $d_2$ of the powder of the alkali metal activator is preferably set to 5 μm or more and 50 μm or less.

With regard to the blend ratio of the two in terms of weight, the weight ratio $[W_2/W_1]$ is preferably set to 2.5 or less, and more preferably to 2.0 or less, where the weight of the powder of the carbonaceous material is $W_1$, and the weight of the powder of the alkali metal activator is $W_2$. This is due to the fact that if the ratio $[W_2/W_1]$ thereof exceeds 2.5 then the alkali metal activator melts more easily, inviting the possibility of reactor corrosion, impurities becoming mixed into system, and other unwanted outcomes. If the ratio [$W_2/W_1$] thereof is, conversely, less than 0.3 then the specific surface area of the activated carbon tends to fall below 300 m$^2$/g, and the electrostatic capacity also tends to decrease. The ratio [$W_2/W_1$] is therefore preferably 0.3 or more, and more preferably 0.5 or more. An even more preferable range for the ratio [$W_2/W_1$] is 0.5 or more and 2.0 or less. The electrostatic capacity of the activated carbon is thereby greatly increased.

A cutting mixer may be used when mixing the powders of the carbonaceous material and the alkali metal activator, and the use of this mixer allows both powders to be uniformly mixed.

Heating Treatment Step

It is preferable to perform the heating treatment on the powder mixture over a maximum period of 24 hours, with the heating temperature T set to 300° C. or less during molding to increase the binding capacity of the alkali metal-containing activator in the molded product. The alkali metal activator softens and the entire powder mixture becomes viscous in an intermediate stage of this heating treatment, and the viscous material is thereafter converted to a solid by means of evaporation of the moisture content. If the heating temperature T exceeds 300° C. then the alkali metal activator completely melts, inviting the possibility of reactor corrosion, impurities becoming mixed into system, and other unwanted outcomes. If the heating temperature T is, conversely, less than 100° C. then the entire powder mixture does not become viscous, and the moisture content does not evaporate, so the significance of the heating treatment may possibly be lost. The preferred lower limit of the heating temperature T is therefore 100° C.

Molding Treatment Step

Pressure molding is performed to improve the deformation strength of the molded form in the heating process under high temperature. After the heating treatment is complete, the pressure P applied to the solid product before cooling or after cooling is preferably set to 2 MPa or more, and more preferably to 10 MPa or more. If the pressure P is less than 2 MPa then the deformation strength of the molded product may be too low. If the pressure P is 40 MPa or more then the molded product becomes highly dense, activation inside the molded product does not adequately progress, and not only does variation in the specific surface area become greater, but the measurement thereof also tends to become more difficult, so the preferred range of pressure P is 2 MPa or more and less than 40 MPa.

When fashioning the molded product into a circular form, the diameter D thereof is preferably 20 mm or less. This is due to the fact that scattering of the alkali metal is inhibited and the activation efficiency inside the molded product is increased by reduction of the surface area of the molded product. The ratio [volume/apparent surface area], which indicates the volume of the molded product in relation to the apparent surface area, is preferably 0.1 or more and 5 or less. If the ratio thereof is less than 0.1 then activation does not adequately progress, and if the ratio thereof conversely exceeds 5 then the shape cannot be maintained and breakdown may occur. The preferred shape of the molded product is any freely determined shape, including spherical, circular, tablet, thread, and rectangular shapes.

The hot press method may also be applied to the manufacturing of the molded product, and the pressure P in relation to the powder mixture is, in this case, preferably set to 2 MPa or more. If the pressure P is less than 2 MPa then the deformation strength of the molded product tends to be excessively low.

The heating temperature in the hot press method is the same temperature as in the heating treatment described above. The upper limit value of the pressure P is preferably 40 MPa because the activation cannot adequately proceed any longer beyond that limit.

Heating Process for the Activation Treatment

The heating process preferably involves using a reactor manufactured with pure nickel, the temperature rise rate is preferably set to 200° C./hour or more and 1,500° C./hour or less, the heating temperature is preferably set to 600° C. or more and 1,000° C. or less, and the heating time t is preferably set to 10$^{-3}$ hours or more and 10 hours or less, in an inert gas environment.

The heating process is preferably performed in advance of the high temperature heating by heating the molded product as required to 400° C. at a temperature rise rate Rt of 0.5° C./minute or more and 2.0° C./minute or less, and subsequently holding the temperature at 400° C. for three hours in order to maintain the shape of the molded product. This heating process serves to dehydrate the molded product in the case that water is contained therein.

A water-induced breakdown treatment is performed on the molded product (including products resulting from the breakdown thereof) by way of the heating process, and an activated carbon with an average particle diameter of about 20 μm can subsequently be obtained by sequentially washing with hydrochloric acid, washing with water, filtering, and drying.

The specific surface area of the activated carbon obtained with such a method has a low numerical value of 1,000 m$^2$/g or less, and a nickel content of 20 ppm or less.

The activated carbon obtained with the manufacturing method of the second present invention as described above can be used as a raw material for the polarizable electrodes of an electric double-layer capacitor in the same manner as the activated carbon obtained by the manufacturing method of the first present invention, and polarizable electrodes and electric double-layer capacitors can be manufactured in the same manner as in the case of the activated carbon obtained by the manufacturing method of the first present invention is used.

EXAMPLES

Examples of the present invention are described in detail below.

The electrostatic capacity in the Examples and Comparative Examples was determined by a method in which a capacitor was charged to a final voltage of 2.5 V at a constant current per unit electrode surface area of 3 mA/cm$^2$, subjected to a supplementary charge for 30 minutes under a constant voltage of 2.5 V, and discharged at 3 mA/cm$^2$ after the supplementary charge had been completed, after which the capacity was calculated from the discharge gradient between that point and the point at which 1.2 V to 1.0 V was reached.

The circuit was opened for one second by suspending charging after completing charging, and the charging current "I" and the voltage drop "ΔV" were obtained immediately before the opening of the circuit. The internal resistance "R" was calculated according to the equation "ΔV=RI".

Example 1

An optically anisotropic pitch that had been obtained by heat-treating cracked petroleum residue and had a Mettler softening point of 285° C. was spun by melt blowing through a nozzle having 1,000 fiber forming holes with a diameter of 0.2 mm in slits having a width of 2 mm, and a mesophase pitch carbon fiber was manufactured by infusibilization and carbonization.

Optically anisotropic mesophase pitch fiber (50 g) pulverized to a maximum length of 200 μm or less in the direction of the major axis, and 100 g of 95% potassium hydroxide pulverized to an average particle diameter of 1 mm or less were added to a 300 mL (milliliter) separable glass flask equipped with a thermometer and an agitator, and the system was agitated at 10 rpm while allowing nitrogen to flow at 200 mL/minute. A reactor was heated in an oil bath, the system was heated and agitated for one hour at a temperature of 160° C., the heat source was thereafter removed, and the system was agitated for an additional hour while allowing nitrogen to flow to obtain a granular molded product (granulation product). The size of the granulation product was 20 mm or less. The granulation product was subsequently dehydrated under a reduced pressure of 1.5 Torr for five hours at a temperature rise rate of 2° C./minute to achieve a temperature of 300° C.

The crushing strength A1 (N) and the diameter B1 (cm) of the obtained granulation product prior to dehydration were measured using a crushing strength testing apparatus (Autograph AG-5000B manufactured by Shimadzu Corp., compression speed of 10 mm/minute), and the crushing strength A2 (N) and the diameter B2 (cm) after dehydration were also measured. The respective ratios [A1/B1] and [A2/B2] were then computed by dividing the crushing strength by the diameter (cm). The obtained values are shown in Table 1.

The dehydrated granulation product was bisected at substantially the center portion thereof; the potassium ratio [M1 (potassium)/C1 (carbon)] of the surface layer region of the sectioned surface thereof, and the potassium ratio [M2 (potassium)/C2 (carbon)] of the center portion were measured using a scanning electron microscope (S-3000N, manufactured by Hitachi, Ltd.) with an energy dispersive X-ray analyzer (EMAX, manufactured by Horiba, Ltd.); and [M1/C1]/[M2/C2] was computed. The obtained results are shown in Table 1. The measuring conditions were SEM magnification: 100 magnifications, measured surface area: 500×500 μm, measuring time: 100 seconds, acceleration voltage: 15 kV, and atmospheric pressure: 10 Pa.

Next, 24 g of the granulation product obtained above was placed in a 2-inch horizontal reactor made from nickel and equipped with a thermometer, the air inside the reactor was replaced with nitrogen, and the temperature was allowed to rise to 700° C. at 200° C./hour under a nitrogen flow rate of 100 mL/minute. After the temperature reached 700° C., the system was held for one hour and then cooled to room temperature for two hours to yield granular activated carbon (activated carbon A). Granular activated carbon (activated carbon B) was again obtained by repeating the above operations.

The initially obtained activated carbon A was separated into a powdery surface layer region of activated carbon Aa, which was obtained by shaving off ⅕ of the depth from the surface thereof to the center, and a center portion activated carbon Ab with the surface layer region shaved off; and the following treatment was performed.

That is, nitrogen that had passed through a distilled water bubbler was circulated to the activated carbon for one hour, and the activated carbon was introduced into 50 mL of water. 200 mL of 1N hydrochloric acid water was added, and the system was subjected to neutralization and wash for eight hours, continuously washed using 3 L of distilled water, desalinated, and dried, yielding 2.7 g of surface layer region activated carbon, and 3.4 g of center portion activated carbon.

The specific surface areas of both the surface layer portion of the activated carbon and the center portion of the activated carbon were calculated using a specific surface area measuring apparatus (Belsorp 18, manufactured by Japan Bel, Inc.). The difference thereof is shown in Table 1. It is apparent from the difference in the specific surface areas that the activated carbon of the present invention has small activation nonuniformity.

Nitrogen that had passed through a distilled water bubbler was circulated to the secondarily obtained activated carbon B for one hour, and the activated carbon was introduced into 50 mL of water. 200 mL of 1N hydrochloric acid water was added thereto, and the system was subjected to neutralization and wash for eight hours, continuously washed using 3 L of distilled water, desalinated, and dried, yielding 6.2 g of activated carbon. Twenty particles of the obtained activated carbon were extracted at random, and the Raman spectrum was measured using a HoloLab SERIES 5000 manufactured by Kaiser Systems, Inc. with a laser wavelength of 532 nm and a laser intensity of 2 mW. The standard deviations of the peak strengths of the graphite D band, the amorphous G band, and the graphite G band in relation to the peak strength of the amorphous D band are listed in Table 1, assuming that the peak strength of the amorphous D band in the Raman spectrum is set to 1.

The obtained activated carbon A or B (100 mg) was decomposed in a wet state first with 200 mL of nitric acid, and then with 20 mL of perchloric acid, and the residual metal content was thereafter measured by ICP spectrometry. The nickel content was 8 ppm.

The activated carbon A or B obtained was further pulverized to an average particle diameter of 5 to 20 μm to obtain pulverulent activated carbon, and a mixture comprising 80 wt % of the pulverulent activated carbon, 10 wt % of conductive carbon, and 10 wt % of polytetrafluoroethylene was kneaded and prepared. The kneaded product was subsequently molded into a sheet having a thickness of 300 μm by calendering, punched out into a circular shape having a diameter of 2 cm using a puncher, and dried for four hours at 150° C. under reduced pressure to fabricate an electrode in a sheet form.

The obtained electrode was sequentially laminated with a collector, a polarizable electrode in a sheet form, a polypropylene unwoven fabric separator, a polarizable electrode in a sheet form, and a collector member, in a stainless steel case, as shown in FIG. 1, inside a glove box with the dew point of −80° C. or lower. The polarizable electrode was thereafter impregnated with propylene carbonate containing 1 mol/L of tetraethylammonium tetrafluoroborate, and the top cover of the stainless steel case was crimped and sealed using an insulating gasket made of polypropylene. A charging and discharging cycle test was conducted 10 times with a constant current until the voltage reached 2.5 V at room temperature using an electric double-layer capacitor evaluation apparatus manufactured by Hioki E.E. Corp., and the electrostatic capacity and internal resistance were measured. The average value of the electrostatic capacity calculated from the discharge curve by established methods was 32.2 F/cc. The circuit was opened for one second by suspending charging after complete charging, and the internal resistance was calculated from the drop in voltage ΔV at that time. The electrostatic capacity retention was determined by first charging the capacitor to 2.5 V, then charging the capacitor at a constant voltage for 800 hours, thereafter calculating the electrostatic capacity at the time of discharge, and calculating the retention from the initial electrostatic capacity. The results are shown in Table 1.

Example 2

Other than using a reduced pressure of 150 Torr inside the reactor in place of the nitrogen flow in Example 1, granulation was performed in the same manner as Example 1, and 6.4 g of activated carbon was obtained in the same manner as in Example 1. The nickel content in the activated carbon was 9 ppm. The electrostatic capacity, internal resistance, electrostatic capacity retention, [A1/B1], [A2/B2], [M1/C1]/[M2/C2], and differences in the specific surface areas were measured for the obtained activated carbon in the same manner as Example 1, and the results are shown in Table 1.

The standard deviations of the obtained peak strengths of the graphite D band, the amorphous G band, and the graphite G band in relation to the peak strength of the amorphous D band were measured in the same manner as in Example 1, and are shown in Table 1.

Comparative Example 1

Other than using 8 g of non-pulverized optically anisotropic pitch fiber having a length of 2 mm in the direction of the major axis, and 16 g of non-pulverized 95% KOH having an average particle diameter of 5 mm in place of that in Example 1, 6.8 g of activated carbon was obtained in the same manner as in Example 1. The nickel content in the activated carbon was 32 ppm. The electrostatic capacity, internal resistance, electrostatic capacity retention, [A1/B1], [A2/B2], [M1/C1]/[M2/C2], and differences in the specific surface areas were measured for the obtained activated carbon in the same manner as Example 1, and the results are shown in Table 1.

An attempt was made to measure the strength of the dehydration product at 320° C., and determine the difference in specific surfaces areas between the surface layer region and the center portion of the activated carbon, but the contents had already melted during dehydration, and measurement was not possible.

The Raman spectrum was measured in the same manner as Example 1. Table 1 shows the standard deviations of the obtained peak strengths of the graphite D band, the amorphous G band, and the graphite G band in relation to the peak strength of the amorphous D band, assuming that the peak strength of the amorphous D band is set to 1.

Example 3

Other than setting the end-point temperature to 750° C. in place of that in Example 1, 6.0 g of activated carbon was obtained in the same manner as Example 1. The nickel content in the activated carbon was 4.4 ppm. The electrostatic capacity, internal resistance, electrostatic capacity retention, [A1/B1], [A2/B2], [M1/C1]/[M2/C2], and differences in the specific surface areas were measured for the obtained activated carbon in the same manner as Example 1, and the results are shown in Table 1.

The standard deviations of the obtained peak strengths of the graphite D band, the amorphous G band, and the graphite G band in relation to the peak strength of the amorphous D band were measured in the same manner as in Example 1, and are shown in Table 1.

Example 4

Other than setting the temperature rise rate during dehydration to 10° C./minute, activated carbon was manufactured with the same method as Example 1, yielding 2.5 g of activated carbon of the surface layer region, 3.7 g of activated carbon of the center portion, and 6.4 g of activation carbon obtained without separating the surface layer region and the center portion. The electrostatic capacity, internal resistance, electrostatic capacity retention, [A1/B1], [A2/B2], [M1/C1]/[M2/C2], and differences in the specific surface areas were measured for the obtained activated carbon in the same manner as Example 1, and the results are shown in Table 1.

The standard deviations of the obtained peak strengths of the graphite D band, the amorphous G band, and the graphite G band in relation to the peak strength of the amorphous D band were measured in the same manner as in Example 1, and are shown in Table 1.

Comparative Example 2

A mixture of 300 g of non-pulverized optically anisotropic pitch having a length of 2 mm in the direction of the major axis and 600 g of 95% potassium hydroxide in flake form were loaded into a vertical reactor that was made of nickel, had a diameter of 6 inches, and was equipped with a thermometer, and the mixture was allowed to stand inside an electric furnace. The system was heated to 730° C. from room temperature at a temperature rise rate of 200° C./hour while allowing a flow of nitrogen into the upper space of the reactor at a rate of 100 mL/minute, and was held for three hours. The system was removed from the electric furnace and cooled to 300° C., the nitrogen gas was switched to carbondioxide gas, and cooling was continued to room temperature. The height at loading was 25 cm, but was 30 cm after activation, and traces of foaming were observed up to a height of about 80 cm from the bottom.

When the reactor was opened after activation, a pale flash was generated on the surface of the blackened activated product and on the inner surface of the reactor, the system turned red, and thereafter violently combusted while scattering matter and producing a large quantity of white smoke. Combustion continued for two hours.

The activated product was dissolved in a quantity of water triple that of the activated product and removed, 2.5 L of 0.6 N hydrochloric acid water was added, neutralization was repeated three times, and the product was thereafter washed five times with 2.5 L of distilled water. The activated carbon after drying was 249 g, and the nickel content in the activated carbon was 1,050 ppm.

TABLE 1

|  | Example 1 | Example 2 | Example 3 | Example 4 | Comparative Example 1 |
|---|---|---|---|---|---|
| Electrostatic capacity (F/cc) | 32.2 | 31.3 | 30.8 | 31.0 | 27.4 |
| Electrostatic capacity retention (%) | 91.4 | 90.3 | 88.6 | 90.6 | 62.2 |
| Internal resistance (Ω) | 16 | 14 | 14 | 16 | 27 |
| Before Dehydration [A1/B1] (N/cm) | 202 |  |  | 202 | Not measurable |
| After Dehydration [A2/B2] (N/cm) | 108 |  |  | 185 | Not measurable |

TABLE 1-continued

|  | Example 1 | Example 2 | Example 3 | Example 4 | Comparative Example 1 |
|---|---|---|---|---|---|
| Potassium Ratio [M1/C1]/[M2/C2] | 1.6 |  |  | 2.6 | Not measurable |
| Specific surface area Difference $(m^2/g)$ | 80 |  |  | 180 |  |
| Standard Deviation of Each Peak Strength |  |  |  |  |  |
| Graphite D Band | 0.0299 | 0.0289 | 0.0275 | 0.0312 | 0.0603 |
| Amorphous G Band | 0.0257 | 0.0262 | 0.0283 | 0.0306 | 0.0362 |
| Graphite G Band | 0.0304 | 0.0306 | 0.0312 | 0.0322 | 0.0343 |

Reference Example 1

Manufacture of Composite Product 1

50 g of the carbonized carbonaceous material powder, which is obtained by dry-distilling and carbonizing coconut shells at 900° C. with a length of 20 μm or less, and 100 g of 95% potassium hydroxide pulverized to an average particle diameter of 1 mm or less were added to a 300 mL (milliliters) separable glass flask equipped with a thermometer and an agitator; and the system was agitated at 10 rpm while allowing nitrogen to flow at 200 mL/minute. The separable flask was heated in an oil bath, the system was heated and agitated for one hour at a temperature of 160° C. inside the container, the heat source was thereafter removed, and the system was agitated for an additional hour while allowing nitrogen to flow to obtain a composite product 1.

Example 5

The composite product (24 g) prepared in reference example 1 was placed in a 2-inch horizontal reactor made from nickel and equipped with a thermometer, the air inside the reactor was replaced with nitrogen, and the temperature was raised to 700° C. at 200° C./hour under a nitrogen flow rate of 100 mL/minute. After the temperature reached 700° C., the system was held for one hour and then cooled to room temperature for two hours. Nitrogen that had passed through a distilled water bubbler was circulated for one hour, and the activated carbon was introduced into 50 mL of water. 200 mL of 1N hydrochloric acid water was added, and the system was subjected to neutralization and wash for eight hours, then continuously washed using 3 L of distilled water, desalinated, and dried, yielding 5.2 g activated carbon.

The obtained activated carbon (100 mg) was decomposed in a wet state first with 200 mL of nitric acid, and then with 20 mL of perchloric acid, and the residual metal content was thereafter measured by ICP spectrometry. The nickel content was 6.7 ppm.

The activated carbon was further pulverized to an average particle diameter of 5 to 20 μm to obtain pulverulent activated carbon, and a mixture comprising 80 wt % of the pulverulent activated carbon, 10 wt % of conductive carbon, and 10 wt % of polytetrafluoroethylene was kneaded and prepared. The kneaded product was subsequently molded into a sheet having a thickness of 300 μm by calendering, punched out into a circular shape having a diameter of 2 cm using a puncher, and dried for four hours at 150° C. under reduced pressure to fabricate an electrode in a sheet form.

This was sequentially laminated with a collector, a polarizable electrode in a sheet form, a polypropylene unwoven fabric separator, a polarizable electrode in a sheet form, and a collector, in a stainless steel case, as shown in FIG. 1, inside a glove box with the dew point of −80° C. or lower. The polarizable electrode was thereafter impregnated with propylene carbonate containing 1 mol/L of tetraethylammonium tetrafluoroborate, and the top cover of the stainless steel case was crimped and sealed using an insulating gasket made of polypropylene. A charging and discharging cycle test was conducted 10 times with a constant current until the voltage reached 2.5 V at room temperature using an electric double-layer capacitor evaluation apparatus manufactured by Hioki E.E. Corp., and the electrostatic capacity, electrostatic capacity retention, internal resistance were measured. The average value of the electrostatic capacity calculated from the discharge curve by an established method was 21 F/cc. The circuit was opened for one second by suspending charging after complete charging, and the internal resistance was calculated from the drop in voltage ΔV at that time. The results are shown in Table 2.

Reference Example 2

Manufacture of Composite Product 2

Other than using a reduced pressure of 150 Torr inside the reactor in place of the nitrogen flow in Reference Example 1, a composite product 2 was obtained in the same manner as reference Example 1.

Example 6

Other than using the composite product 2 in place of the composite product 1 in Example 1, 5.3 g of activated carbon was obtained in the same manner as Example 5. The nickel content in the activated carbon was 3.77 ppm. The results of measuring the electrostatic capacity, electrostatic capacity retention, and internal resistance are shown in Table 2.

Comparative Example 3

6.8 g of activated carbon was obtained in the same manner as Example 1, except that 8 g of coconut shell powder with an average particle diameter of 1 mm, obtained by dry distilling and carbonizing coconut shells at 900° C., was used together with 16 g of non-pulverized 95% potassium hydroxide in place of the composite product 1 in Example 6. The nickel content in the activated carbon was 111 ppm. The results of measuring the electrostatic capacity, electrostatic capacity retention, and internal resistance are shown in Table 2.

TABLE 2

|  | Electrostatic capacity (F/cc) | Electrostatic capacity retention (%) | Internal resistance (Ω) |
|---|---|---|---|
| Example 5 | 21 | 89.3 | 16 |
| Example 6 | 23 | 90.1 | 14 |
| Comparative Example 3 | 19 | 70.3 | 27 |

Reference Example 3

Manufacture of Composite Product 3

BELLPEARL manufactured by Kanebo, Ltd. was dry distilled at 500° C.; 50 g of the carbon pulverized to 30 μm or less, and 100 g of 95% potassium hydroxide pulverized to an average particle diameter of 1 mm or less were added to a 300 mL (milliliters) separable glass flask equipped with a thermometer and an agitator; and the system was agitated at 10 rpm while allowing nitrogen to flow at 200 mL/minute. The separable flask was heated in an oil bath, the system was heated and agitated for one hour at a temperature of 160° C. inside the container, the heat source was thereafter removed, and the product was agitated for an additional hour while allowing nitrogen to flow to obtain a composite product 3.

Example 7

The composite product 3 (24 g) was placed in a 2-inch horizontal reactor made from nickel and equipped with a thermometer, the air inside the reactor was replaced with nitrogen, and the temperature was raised to 700° C. at 200° C./hour under a nitrogen flow rate of 100 mL/minute. After the temperature reached 700° C., the system was held for one hour and then cooled to room temperature for two hours. Nitrogen that had passed through a distilled water bubbler was circulated for one hour, and was then added to 50 mL of water. 200 mL of 1N hydrochloric acid water was added, and the system was subjected to neutralization and wash for eight hours, then continuously washed using 3 L of distilled water, desalinated, and dried, yielding 6.2 g activated carbon.

100 mg of the resulting obtained activated carbon was decomposed in a wet state first with 200 mL of nitric acid, and then with 20 mL of perchloric acid, and the residual metal content was thereafter measured by ICP spectrometry. The nickel content was 8 ppm.

The activated carbon was further pulverized to an average particle diameter of 5 to 20 μm to obtain pulverulent activated carbon, and a mixture comprising 80 wt % of the pulverulent activated carbon, 10 wt % of conductive carbon, and 10 wt % of polytetrafluoroethylene was kneaded and prepared. The kneaded product was subsequently molded into a sheet having a thickness of 300 μm by calendering, and punched out into a circular shape having a diameter of 2 cm using a puncher. The product was dried for four hours at 150° C. under reduced pressure to fabricate an electrode in a sheet form.

This was sequentially laminated with a collector, a polarizable electrode in a sheet form, a polypropylene unwoven fabric, a polarizable electrode in a sheet form, and a collector, in a stainless steel case, as shown in FIG. 1, inside a glove box with the dew point of −80° C. or lower. The polarizable electrode was thereafter impregnated with propylene carbonate containing 1 mol/L of tetraethylammonium tetrafluoroborate, and the top cover of the stainless steel case was crimped and sealed using an insulating gasket made of polypropylene. A charging and discharging cycle test was conducted 10 times with a constant current until the voltage reached 2.5 V at room temperature using an electric double-layer capacitor evaluation apparatus manufactured by Hioki E.E. Corp., and the electrostatic capacity, electrostatic capacity retention, and internal resistance were measured. The average value of the electrostatic capacity calculated from the discharge curve by established methods was 26 F/cc. The circuit was opened for one second by suspending charging after complete charging, and the internal resistance was calculated from the drop in voltage ΔV at that time. The results are shown in Table 3.

Reference Example 4

Manufacture of Composite Product 4

Other than using a reduced pressure of 150 Torr inside the reactor in place of the nitrogen flow in reference example 3, a composite product 4 was obtained in the same manner as reference example 3.

Example 8

Other than using the composite product 4 in place of the composite product 3 in Example 7, 6.4 g of activated carbon was obtained in the same manner as Example 7. The nickel content in the activated carbon was 9 ppm. The results of measuring the electrostatic capacity, electrostatic capacity retention, and internal resistance are shown in Table 3.

Comparative Example 4

Other than using 8 g of the carbonized phenol resin with an average particle diameter of 0.1 mm and 16 g of non-pulverized 95% potassium hydroxide in place of the composite product 3 in Example 7, 6.8 g of activated carbon was obtained in the same manner as Example 8. The nickel content in the activated carbon was 32 ppm. The results of measuring the electrostatic capacity, electrostatic capacity retention, and internal resistance are shown in Table 3.

Example 9

Other than setting the end-point temperature to 750° C. in place of that in Example 7, 6.0 g of activated carbon was obtained in the same manner as Example 7. The nickel content in the activated carbon was 4.4 ppm. The results of measuring the electrostatic capacity, electrostatic capacity retention, and internal resistance are shown in Table 3.

Example 10

A composite product was manufactured using the carbonized phenol resin fiber in place of the phenol resin carbide pulverized product in Reference Example 3. Other than using this in place of that in Example 7, 5.4 g of activated carbon fiber was obtained in the same manner as Example 8. The nickel content in the activated carbon was 2.1 ppm, the system was pulverized in a mixer, and the results of measuring the electrostatic capacity, electrostatic capacity retention, and internal resistance are shown in Table 3.

Reference Example 5

Manufacture of Composite Product 5

Sulfuric acid (200 g) was added to 100 g of ethylene-vinyl alcohol copolymer, and agitated for three hours at 140° C. This was poured in 1,000 g of ice water and rinsed, and the acid condensation product was filtered out, washed again with 10 L of distilled water, and dried to yield 28 g of acid condensation product. The product was mixed with 56 g of potassium hydroxide in accordance with Reference Example 3 to obtain a composite product 5.

Example 11

Other than replacing the phenol resin in Example 7 with the composite product 5 obtained in Reference Example 5, 4.7 g of activated carbon was obtained in the same manner as Example 7. The nickel content in the activated carbon was 1.7 ppm. The results of measuring the electrostatic capacity, electrostatic capacity retention, and internal resistance are shown in Table 3.

TABLE 3

|  | Electrostatic capacity (F/cc) | Electrostatic capacity retention (%) | Internal resistance (Ω) |
| --- | --- | --- | --- |
| Example 7 | 26.0 | 90.5 | 14 |
| Example 8 | 26.5 | 89.6 | 13 |
| Comparative Example 4 | 25.0 | 66.1 | 12 |
| Example 9 | 26.3 | 90.1 | 13 |
| Example 10 | 26.7 | 89.3 | 12 |
| Example 11 | 24.1 | 88.7 | 20 |

Example 12

A ball mill composed of nylon resin with an internal volume of 100 L was loaded to 50% capacity with alumina balls having a diameter of 30 mm. The interior of the ball mill was replaced with air having a low dew point of −17° C., and 25 kg of 95% potassium hydroxide in flake form and 0.75 kg of mesophase pitch carbon fiber (3 wt %/95% potassium hydroxide) were loaded. A uniform pulverized product having an average particle diameter of 10 μm and excellent fluidity was obtained without bridge formations by operating the ball mill for two hours at a circumferential speed of 1 m/sec.

Mesophase pitch carbon fiber (0.63 kg) pulverized so that the maximum length in the axial direction was 200 μm or less, and 1.3 kg of 95% potassium hydroxide to which the mesophase pitch carbon fiber pulverized with the ball mill had been added, were placed in a batch-type, externally heated rotary kiln composed of nickel with a diameter of 400 mm and a length of 300 mm, and equipped with a thermometer, and the rotary kiln was rotated at 30 rpm under a reduced pressure of 0.3 Torr (95% potassium hydroxide/mesophase pitch carbon fiber=1.8 weight ratio).

The mixture of mesophase pitch carbon fiber and potassium hydroxide was heated to raise the temperature from room temperature to 100° C. at a rate of 0.5° C./minute, and while maintaining the rotational speed of the rotary kiln and the reduced pressure condition, the power was cut, and the system was allowed to cool, yielding a granular product. The size of the granular product was 16 mm or less.

While rotating at 30 rpm using the same rotary kiln, the temperature of the granulation product was raised to 320° C. from room temperature at a rate of 0.5° C./minute under reduced pressure of 0.3 Torr, and this temperature was maintained for one hour to dehydrate the product.

The granular product obtained from dehydration was classified into fractions with particle diameters of 1 mm or less, 1 to 2.4 mm, 2.4 to 4.8 mm, 4.8 to 8 mm, 8 to 11 mm, 11 to 16 mm, and 16 mm or more. The results of measuring the 95% potassium hydroxide/mesophase pitch carbon fiber weight ratios are shown in Table 4.

TABLE 4

| Particle diameter (mm) | Composition ratio | Composition ratio variability (%) |
| --- | --- | --- |
| <1 | 1.85 | +3 |
| 1 to 2.4 | 1.79 | −0.6 |
| 2.4 to 4.8 | 1.79 | −0.6 |
| 4.8 to 8 | 1.79 | −0.6 |
| 8 to 11 | 1.77 | −1.7 |
| 11 to 16 | 1.75 | −2.8 |
| 16< | 1.73 | −3.9 |

An externally heated rotary kiln-type electric furnace comprising a thermometer, a nitrogen inlet, and a gas exhaust port having a water trap, and having a temperature-variable activation zone (activation zone inside diameter of 100 mm, and internal volume of 400 mL) was used as the activation furnace. The granular product (50 g) after dehydration was loaded into the activation zone under a nitrogen flow. The temperature of the activation zone was raised from room temperature to 730° C. at a temperature rise rate of 200° C./hour while allowing nitrogen to flow at 300 mL/minute, and after reaching the predetermined temperature, the temperature was held for three hours. The system was thereafter cooled to 50° C. or less under a nitrogen flow, and the activated carbon material obtained by activation was then treated under a flow of mixed gas of carbon dioxide gas and water vapor to deactivate the residual metal potassium.

The above activation operations were repeated to manufacture activated carbon, and the activated carbon was washed and fabricated into an electrode in a sheet form in the same manner as Example 1. An electric double-layer capacitor was fabricated with the same operations as Example 1, and when the electrostatic capacity was measured, the average was 32 F/cc, and the variation thereof was small as 32±0.3 F/cc, resulting in a uniform electric double-layer capacitor. The nickel and iron contents were respectively 5 ppm and 3 ppm.

The electrostatic capacity, internal resistance, electrostatic capacity retention, [A1/B1], [A2/B2], [M1/C1]/[M2/C2], and differences in the specific surface areas were measured for the obtained activated carbon in the same manner as in Example 1, and the results are shown in Table 7.

The standard deviations of the obtained peak strengths of the graphite D band, the amorphous G band, and the graphite G band in relation to the peak strength of the amorphous D band were measured in the same manner as in Example 1, and are shown in Table 7.

Example 13

20 kg of the flaky 95% potassium hydroxide and 1.0 kg of mesophase pitch carbon fiber (5 wt %/95% potassium hydroxide) were loaded, and other than pulverizing the flaky potassium hydroxide, a granular product after dehydration was obtained in the same manner as Example 12. The obtained granular product was similarly separated into categories of particle diameters, and the results are shown in Table 5.

TABLE 5

| Particle diameter (mm) | Composition ratio | Composition ratio variability (%) |
| --- | --- | --- |
| <1 | 1.85 | +3 |
| 1 to 2.4 | 1.80 | 0 |
| 2.4 to 4.8 | 1.79 | −0.6 |

TABLE 5-continued

| Particle diameter (mm) | Composition ratio | Composition ratio variability (%) |
|---|---|---|
| 4.8 to 8 | 1.79 | −0.6 |
| 8 to 11 | 1.78 | −1.1 |
| 11 to 16 | 1.76 | −2.2 |
| 16< | 1.73 | −3.9 |

An electric double-layer capacitor was fabricated in the same manner as Example 12, and when the electrostatic capacity was measured, the average was 32.3 F/cc, and the variation thereof was small at 32.3±0.3 F/cc, resulting in a uniform electric double-layer capacitor. The nickel and iron contents were respectively 4 ppm and 3 ppm.

When conducted in the same manner as Example 12 without adding mesophase pitch carbon fiber in advance, the results noted in Table 6 were obtained.

TABLE 6

| Particle diameter (mm) | Composition ratio | Composition ratio variability (%) |
|---|---|---|
| <1 | 2.11 | +17 |
| 1 to 2.4 | 1.61 | −10.6 |
| 2.4 to 4.8 | 1.66 | −8.8 |
| 4.8 to 8 | 1.74 | −3.3 |
| 8 to 11 | 1.78 | −1.1 |
| 11 to 16 | 1.76 | −2.2 |
| 16< | 1.73 | −3.9 |

An electric double-layer capacitor was fabricated in the same manner as Example 12. The nickel and iron contents were respectively 9 ppm and 7 ppm, and when the electrostatic capacity was measured, the average was 31.1 F/cc, and the variation thereof was 31.1±0.8 F/cc.

The electrostatic capacity, internal resistance, electrostatic capacity retention, [A1/B1], [A2/B2], [M1/C1]/[M2/C2], and differences in the specific surface areas were measured for the obtained activated carbon in the same manner as in Example 1, and the results are shown in Table 7.

The standard deviations of the obtained peak strengths of the graphite D band, the amorphous G band, and the graphite G band in relation to the peak strength of the amorphous D band were measured in the same manner as in Example 1, and are shown in Table 7.

Example 14

After granulation and dehydration were performed in the same manner as Example 12, an externally heated rotary kiln-type electric furnace (SUS304) that comprised a continuous feeding device for the granular product after dehydration, a thermometer, a nitrogen inlet, and a gas exhaust port having a water trap, and had a temperature-variable activation zone (activation zone inside diameter of 300 mm, and activation length of 6,000 mm, and internal volume of 416 L) was used as the activation furnace, and activation treatment was performed using the continuous process.

Operation was started by rotating the rotary kiln at a rotational speed of 2 rpm (circumferential speed of 2 m/minute). The activation zone was adjusted to a predetermined temperature gradient while allowing nitrogen to flow at a rate of 5.5 L/minute, and the granular product after dehydration was continuously fed at a rate of 2.7 kg/hour. The activation reaction progressed from room temperature to 730° C. at a temperature rise rate of 1° C./minute. The heating time to 700° C. or more was four hours, and the residence time inside the rotary kiln was 24.2 hours. After cooling by passing through the cooling zone of the rotary kiln, the activated product continuously discharged was stored in a discharge receptacle. The activated product was removed from the reactor and treated under a flow of carbon dioxide gas to deactivate the residual metal potassium.

A mixture comprising 80 wt % of the pulverulent activated carbon in which the activated product was pulverized to an average particle diameter of 5 to 20 μm, 10 wt % of conductive carbon, and 10 wt % of polytetrafluoroethylene was kneaded and prepared. The kneaded product was subsequently molded into a sheet having a thickness of 300 μm by calendering, and punched out into a circular shape having a diameter of 2 cm using a puncher. The product was dried for four hours at 150° C. under reduced pressure to fabricate an electrode in a sheet form.

This was sequentially laminated with a collector member, a polarizable electrode in a sheet form, a polypropylene unwoven fabric separator, a polarizable electrode in a sheet form, and a collector on a stainless steel cover inside a glove box with the dew point of −80° C. or lower, the polarizable electrode was thereafter impregnated with a propylene carbonate solution containing 1 mol/L of tetraethylammonium tetrafluoroborate, and the stainless steel top cover was crimped and sealed using an insulating gasket made of polypropylene, resulting in the fabrication of an electric double-layer capacitor such as that shown in FIG. 1. A charging and discharging cycle test was conducted 10 times with a constant current until the voltage reached 2.5 V at room temperature using an electric double-layer capacitor evaluation apparatus manufactured by Hioki E.E. Corp., and the electrostatic capacity was measured. The average value of the electrostatic capacity calculated from the discharge curve by established methods was 33.0 F/cc.

The electrostatic capacity, internal resistance, electrostatic capacity retention, [A1/B1], [A2/B2], [M1/C1]/[M2/C2], and differences in the specific surface areas were measured for the activated carbon obtained in the same manner as in Example 1, and the results are shown in Table 7.

The standard deviations of the obtained peak strengths of the graphite D band, the amorphous G band, and the graphite G band in relation to the peak strength of the amorphous D band were measured in the same manner as in Example 1, and are shown in Table 7.

Example 15

Other than allowing the activation reaction in Example 14 to progress from room temperature to 730° C. at a temperature increase rate of 2° C./minute, and setting the heating time to 700° C. or more to 2.4 hours and the residence time inside the rotary kiln to 14.5 hours, the same operations as in Example 14 were performed. The specific surface area and the pore volume of the product were respectively 1,084 m²/g and 0.48 cc/g. The potassium, nickel, and iron contents were respectively 50 ppm, 0.2 ppm, and 1.5 ppm. The electrostatic capacity was 31.5 F/cc.

The electrostatic capacity, internal resistance, electrostatic capacity retention, [A1/131], [A2/B2], [M1/C1]/[M2/C2], and differences in the specific surface areas were measured for the activated carbon obtained in the same manner as in Example 1, and the results are shown in Table 7.

The standard deviations of the obtained peak strengths of the graphite D band, the amorphous G band, and the graphite G band in relation to the peak strength of the amorphous D band were measured in the same manner as in Example 1, and are shown in Table 7.

Reference Example 6

An optically anisotropic pitch that had been obtained by heat-treating cracked petroleum residue and had a Mettler softening point of 285° C. was spun by melt blowing through a nozzle having 1,000 fiber forming holes with a diameter of 0.2 mm in slits having a width of 2 mm, and a mesophase pitch carbon fiber was manufactured by infusibilization and carbonization.

A carbonaceous material (0.74 kg) in which the mesophase carbon fiber fabricated in the method described above was pulverized to a maximum length of 200 μm or less in the direction of the major axis, and 1.26 kg of 95% potassium hydroxide pulverized to an average particle diameter of 100 μm or less were placed in a stainless steel, double cone-type mixer having a diameter of 800 mm and equipped with a thermometer, and the double cone-type mixer was rotated at 16 rpm under a reduced pressure of 3.0 Torr. The mixture of mesophase pitch carbon fiber and potassium hydroxide was heated to raise the temperature from room temperature to 130° C. at a rate of 1.0° C./minute, and the system was then allowed to cool while the rotational speed of the rotary kiln and the reduced pressure condition were maintained, yielding a granulation product. The size of the granulation product was 10 mm or less.

Example 16

The granulated product (0.5 kg) obtained in Reference Example 6 was placed in the rotary kiln that was made of nickel, had a diameter of 400 mm and a length of 200 mm, was equipped with a thermometer, and served as a dehydration apparatus. The pressure was held at 3 Torr, and the kiln was rotated at 16 rpm while the temperature was raised from room temperature to 300° C. at a rate of 2.0° C./minute. The system was immediately cooled upon reaching 300° C. while the pressure and rotational speed were kept unchanged, and the granulated product was then removed. It was confirmed by visual observation that the granulation product had been dehydrated while maintaining the solid state.

The electrostatic capacity, internal resistance, electrostatic capacity retention, [A1/B1], [A2/B2], [M1/C1]/[M2/C2], and differences in the specific surface areas were measured for the obtained activated carbon in the same manner as in Example 1, and the results are shown in Table 7.

The standard deviations of the obtained peak strengths of the graphite D band, the amorphous G band, and the graphite G band in relation to the peak strength of the amorphous D band were measured in the same manner as in Example 1, and are shown in Table 7.

TABLE 7

| | Example 12 | Example 13 | Example 14 | Example 15 | Example 16 |
|---|---|---|---|---|---|
| Electrostatic capacity (F/cc) | 32.0 | 32.3 | 33.0 | 31.5 | 31.5 |
| Electrostatic capacity retention (%) | 91.2 | 90.6 | 91.8 | 90.9 | 90.3 |
| Internal resistance (Ω) | 14 | 15 | 14 | 16 | 16 |
| Before Dehydration [A1/B1] (N/cm) | 180 | 189 | 180 | 180 | 170 |
| After Dehydration [A2/B2] (N/cm) | 96 | 99 | 96 | 96 | 88 |
| Potassium Ratio [M1/C1]/[M2/C2] | 1.6 | 1.6 | 1.6 | 1.6 | 1.7 |
| Specific surface area Difference (m²/g) | 70 | 80 | 80 | 70 | 90 |
| Standard Deviation of Each Peak Strength | | | | | |
| Graphite D Band | 0.0295 | 0.0301 | 0.0303 | 0.0293 | 0.0297 |
| Amorphous G Band | 0.0276 | 0.0269 | 0.0271 | 0.0262 | 0.0271 |
| Graphite G Band | 0.0312 | 0.0311 | 0.0311 | 0.0308 | 0.0313 |

Example 17

0.2 kg of granulation product obtained by repeating Reference Example was placed in an oblong Pyrex glass flask serving as a dehydration apparatus with a 500 mL capacity and equipped with a thermometer. The pressure was held at 3 Torr, and the flask was rotated at 16 rpm while the temperature was raised from room temperature to 300° C. at a rate of 2.0° C./minute. The system was immediately cooled upon reaching 300° C. while the pressure and rotational speed were kept unchanged, and the granulation product was then removed. It was confirmed in the same manner as Example 1 that the granulation product had been dehydrated while maintaining the solid state.

Examples 18 and 19, Comparative Examples 5 to 7

Other than changing the pressure inside the container and the temperature rise rate as shown in Table 7, dehydration was performed with the same method as in Example 17. The results are shown in Table 8. It is apparent from these results that dehydration can be performed while maintaining the solid state of the mixture of mesophase pitch carbon fiber and potassium hydroxide by combining the pressure inside the container with the temperature rise rate for the dehydration treatment.

TABLE 8

| | Container Pressure (Torr) | Temperature Rise Rate [° C./minute] | State during Dehydration Treatment |
|---|---|---|---|
| Example 18 | 10 | 0.8 | Solid State Maintained |

TABLE 8-continued

| | Container Pressure (Torr) | Temperature Rise Rate [° C./minute] | State during Dehydration Treatment |
|---|---|---|---|
| Emample 19 | 1 | 10 | Solid State Maintained |
| Comparative Example 5 | 10 | 2 | Melted |
| Comparative Example 6 | 52 | 0.5 | Melted |
| Comparative Example 7 | 3 | 8 | Melted |

Example 20

0.7 kg of pitch in which the mesophase pitch carbon fiber fabricated in Reference Example 6 was pulverized to a maximum length of 200 μm or less in the direction of the major axis, and 1.3 kg of 95% potassium hydroxide pulverized to an average particle diameter of 1 mm or less were loaded into a batch-type, externally-heated rotary kiln that was made from nickel, had a diameter of 400 mm and a length of 300 mm, and was equipped with a thermometer. The rotary kiln was rotated at 30 rpm under a reduced pressure of 0.3 Torr. The mixture of mesophase pitch carbon fiber and potassium hydroxide was heated from room temperature to 100° C. at a rate of 0.5° C./minute, the power was cut while the rotational speed of the rotary kiln and the reduced pressure condition were kept unchanged, and the system was allowed to cool, yielding a granulation product. The size of the granulation product was 10 mm or less.

While rotating at 30 rpm using the same rotary kiln, the temperature of the granulation product was raised to 320° C. from room temperature at a rate of 0.5° C./minute under reduced pressure of 0.3 Torr, the temperature was maintained for one hour, and the product was dehydrated.

The activation furnace was an externally-heated, rotary kiln-type electric furnace that was made from nickel, that comprised a thermometer, a nitrogen inlet, and a gas exhaust port having a water trap, and that had a temperature-variable activation zone (activation zone inside diameter of 100 mm, internal volume of 400 mL (milliliters)), and an activated carbon loading zone (loading zone inside diameter of 28 mm, and internal volume of 230 mL) as a sorbent material (adsorbent). The dehydration product (50 g) was loaded into the activation zone under a nitrogen flow, and 10 g (loading capacity 20 mL) of coconut shell activated carbon (GG4/8, manufactured by Kuraray Chemical Co., Ltd.) was loaded so as not to leave a cavity.

While allowing nitrogen to flow at a rate of 300 mL/minute (activation zone residence time of 4.0 seconds, and gas linear velocity of 8.3 mm/second), the temperature of the activation zone was raised from room temperature to 730° C., the temperature of the loading zone was raised to 650° C. at a temperature rise rate of 200° C./hour, and the system was held for three hours after reaching the predetermined temperature. The system was thereafter cooled to 50° C. or less under a nitrogen flow, the activated carbon used to adsorb the alkali metal and the activated carbon obtained by activation were removed, potassium was obtained by titration with 0.1N hydrochloric acid, and the residual quantity of potassium was determined by quantifying the hydrogen generated by adding water. Metal potassium, strong alkali salts, and weak alkali salts were contained in the potassium obtained by titration, and scattering of the metal potassium and strong alkali salt was a problem.

As a result of analysis, generation of hydrogen due to residual potassium was not observed from either the activated carbon used in sorption or the activated carbon obtained by activation, and the weak alkali salts that are assumed to originate in potassium carbonate in the water trap were only detected at 0.1 mol % of the loaded potassium content, indicating that the potassium scattered from the activation zone was captured in the adsorbent loading zone and deactivated.

Example 21

12 g of the same dehydrated product as in Example 20 was used, and the activation furnace was an electric furnace equipped with a thermometer, a nitrogen inlet, and a gas exhaust port having a water trap, and had a built-in reaction tube made from nickel with an internal diameter of 42 mm with an activation zone and an adsorbent loading zone. The same coconut shell activated carbon 5 g (loading capacity 10 mL) used in Example 1 was loaded into the adsorbent loading zone, and while allowing nitrogen to flow at a rate of 300 mL/minute (the residence time of 2.0 seconds in the activation zone, and gas linear velocity of 3.6 mm/second), the temperature of the activation zone was raised from room temperature to 730° C., the temperature of the adsorbent loading zone was raised to 700° C. at a temperature rise rate of 200° C./hour, and the system was held for an hour after reaching the predetermined temperature.

The system was thereafter cooled to 50° C. or less under a nitrogen flow, and the activated product and the activated carbon for adsorption were removed. Determinations were made as to the potassium calculated by titration with 0.1N hydrochloric acid, and the residual quantity of potassium calculated by quantifying the hydrogen generated by the addition of water, but there was no observable generation of hydrogen due to the metal potassium residue from either the activated product or the activated carbon for adsorption, and the weak alkali salts that were assumed to originate in potassium carbonate in the water trap were only detected at 0.08 mol % of the loaded potassium, indicating that the potassium scattered from the activation zone was captured in the activated carbon zone for adsorption and stabilized.

Examples 22 to 25, Comparative Examples 8 to 10

Other than changing the nitrogen flow rate, activation zone temperature, activation zone for adsorption temperature, and type and quantity of activated carbon for adsorption, activation operations were performed with the same method as in Example 21. The obtained results are shown in Table 9.

TABLE 9

|  | Examples | | | | Comparative Examples | | |
| --- | --- | --- | --- | --- | --- | --- | --- |
|  | 22 | 23 | 24* | 25 | 8 | 9 | 10* |
| Nitrogen flow (ml/minute) | 120 | 350 | 200 | 150 | 500 | 600 | 900 |
| Contact time (seconds) | 5.0 | 1.7 | 3.0 | 4.5 | 0.4 | 0.3 | 0.3 |
| Line speed (mm/minute) | 1.4 | 4.2 | 2.4 | 1.8 | 6.0 | 7.2 | 10.8 |
| Activation zone temperature (° C.) | 730 | 800 | 700 | 730 | 730 | 750 | 730 |
| Sorption zone temperature (° C.) | 410 | 700 | 450 | 700 | 400 | 500 | 250 |
| Existence of hydrogen generation | No | No | No | No | Yes | Yes | Yes |
| Strong alkali in the trap | Not Detected | Not Detected | Not Detected | Not Detected | 0.5** | 0.6** | 1.2** |

*Using coal activated carbon
**Molar percent in relation to the loaded alkali

In the cases of Comparative Examples 8 to 10, in which the contact time between the activated carbon for adsorption and nitrogen gas was less than 0.5 seconds, as shown in Table 9, hydrogen was generated when activated carbon material and the activated carbon for adsorption were washed with water, so it is apparent that the metal potassium was held in these in an active state. It is particularly apparent from the results of Comparative Example 10 that the quantity of alkali metal that was not deactivated increased when the adsorption zone temperature was less than 300° C.

In contrast to the above, the results of Examples 22 to 25, which have contact times greater that exceed 0.5 seconds, and adsorption zone temperatures that are between 300 and 800° C., indicate that hydrogen was not generated and that strong alkalis were not detected in the trap, so it is apparent that the alkali metal in vapor form that was generated during the heat treatment of the activation treatment was deactivated by the activated carbon for adsorption.

Example 26

(1) Three grams ($W_1$) of a carbonaceous material powder (atomic ratio H/C=0.2) with an average particle diameter of 15 μm, obtained using mesophase pitch as the starting material, and 5.7 g ($W_2$) of 95%-pure KOH powder having an average particle diameter of 50 μm and serving as an alkali metal-containing activator powder were thoroughly mixed at room temperature (20° C.) with the aid of a cutting mixer to obtain a powder mixture. The ratio of both weights ($W_2/W_1$) in this powder mixture was 1.9.

(2) The powder mixture was placed in a PTFE container inside of an electric furnace at 200° C., and heating treatment was performed for 24 hours under a nitrogen flow (linear velocity=20 cm/minute), yielding a solid product.

(3) After heating, the uncooled solid product was pressed under 20 MPa in a tablet molding machine to fashion a molded tablet product in table form with a diameter of 10 mm and a thickness of 2 mm.

(4) The molded tablet product obtained was placed in a reactor that was made from pure nickel, and the temperature was first raised to 400° C. at a temperature rise rate of 0.5° C./minute under a nitrogen flow (linear velocity 20 cm/minute), then held at 400° C. for three hours, raised to 730° C. at a temperature rise rate of 200° C./hour, and subsequently held for three hours at 730° C. The shape of the product remained unchanged before and after the high heat treatment subjected to this type of high temperature heating did not change from that of the molded product before and after the high heat treatment.

(5) The heat-treated product in tablet form was broken down by water, sequentially washed with 0.1N hydrochloric acid and with water, filtered, and dried to obtain an activated carbon with an average particle diameter 20 μm as the activated carbon of Example 26.

Example 27

Other than setting the pressure P applied during the molding of the tablet product to 5 MPa, an activated carbon having an average particle diameter of 20 μm was obtained as the activated carbon of Example 27 by the same method as the one in Example 26. In this case, partial melting in the heat-treated product was observed during the same high temperature heating as that performed in step (4) of Example 26, but the melted portion did not adhere to the reactor. It was possible to remove this treatment product from the reactor by washing out with water.

Example 28

Other than setting the average particle diameter of the carbonaceous material powder to 20 μm, a molded tablet product having a diameter of 10 mm and a thickness of 2 mm was obtained as the activated carbon of Example 28 by conducting hot pressing under conditions that corresponding to a heating temperature of 260° C., an applied pressure of 2 MPa, and an applied pressure holding time of 60 seconds, using the same powder mixture as in Example 26.

Comparative Example 11

(1) Three grams ($W_1$) of a carbonaceous material powder (atomic ratio H/C=0.2) with an average particle diameter of 20 μm, obtained using mesophase pitch as the starting material, and 5.7 g ($W_2$) of 95%-pure KOH powder having an average particle diameter of 50 μm and serving as the alkali metal activator powder were sufficiently mixed at room temperature (20° C.) with the aid of a cutting mixer to obtain a powder mixture. The ratio of both weights [$W_2/W_1$] in this powder mixture was 1.9.

(2) The powder mixture obtained was placed in a reactor that was made from pure nickel so as to have a height of 5 mm, the reactor containing the powder mixture was subsequently held for three hours at 400° C. under a nitrogen flow (linear velocity=20 cm/minute), and the temperature was thereafter raised to 730° C. at a temperature rise rate of 200° C./hour, and then held for three hours at 730° C. The entire product obtained by high heat treatment melted and adhered to the interior surface of the reactor, and the height raised to 10 to 18 mm due to bubbling.

(3) Distilled water was put into the reactor, and the treatment product was formed into slurry and removed from the reactor.

(4) The slurry was filtered to collect the solid content, sequentially washed first with 0.1N hydrochloric acid and then with water, filtered, and dried to obtain an activated carbon with an average particle diameter 20 μm as the activated carbon of comparative example 11.

Comparative Example 12

Other than setting the ratio of weights [$W_2/W_1$] of the KOH powder and the carbonaceous material to $6.1/3=2.03$ using 6.1 g ($W_2$) of 95%-pure KOH powder having an average particle diameter of 20 μm, an activated carbon having an average particle diameter of 20 μm was obtained as the activated carbon of Comparative Example 12 by the same method as Comparative Example 11, that is, the method that includes bubbling and the formation of a slurry in the same manner as described above.

Comparative Example 13

Other than setting the pressure P applied during the molding in tablet form to 1.5 MPa, a tablet product was molded in the same manner as Example 27 with the same method as Example 26, and the molded tablet product was subsequently placed in a reactor that was made from pure nickel to obtain the activated carbon with an average particle diameter 20 μm of Comparative Example 13 by performing the processes of steps (2) to (4) in Comparative Example 11.

Comparative Example 14

Other than setting the pressure P applied during the molding in tablet form to 40 MPa, a tablet product was molded in the same manner as Example 26 with the same method as Example 27, and the molded tablet product was subsequently placed in a reactor that was made from pure nickel to obtain the activated carbon with an average particle diameter 20 μm of Comparative Example 14 by performing the processes of steps (2) to (4) in Comparative Example 11.

Comparative Example 15

Other than setting the pressure P applied during the molding in tablet form to 40 MPa, a tablet product was molded in the same manner as Example 26 with the same method as Example 27, and the molded tablet product was subsequently placed in a reactor that was made from pure nickel to obtain an activated carbon with an average particle diameter of 20 μm as the activated carbon of Comparative Example 15 by performing the processes of steps (2) to (4) in Comparative Example 11.

(Measurement of the Specific Surface Area and Nickel Content of Activated Carbon)

(a) Measurement of the Specific Surface Area

Vacuum deaeration treatment was performed for about six hours at 30° C. for each of the activated carbons of Examples 26 to 28 and Comparative Examples 11 to 15, 0.1 g samples were subsequently collected from the treatment products, and the specific surface areas of the samples were measured with the aid of an ASSP2010 apparatus manufactured by Shimadzu Corp., in accordance with the BET method by using version 2.0 of an analysis software program to analyze the distribution of pores. The obtained results are shown in Table 9.

(b) Measurement of Nickel Content

A 0.5 g sample of each activated carbon of Examples 26 to 28 and Comparative Examples 11 to 15 was collected, and the nickel contents of the samples were measured by the wet decomposition method with the aid of an ICP mass analyzer. The results obtained are shown in Table 9.

(Manufacture of Button-Type Electric Double-Layer Capacitor)

The activated carbon of Examples 26 to 28 and comparative examples 11 to 15, graphite powder (conductive filler), and PTFE (binder) were weighed so as to achieve a weight ratio of 90:5:5, the weighed products were subsequently kneaded, and an electrode sheet having a thickness of 185 μm was thereafter manufactured by calendering with the aid of a kneader. Two polarizable electrodes having a diameter of 2 mm were cut from the electrode sheet, and the button-type electric double-layer capacitor like FIG. 1 was manufactured as the electric double-layer capacitor of Examples 26 to 28 and Comparative Examples 11 to 15 by using these two polarizable electrodes, a spacer made from PTFE having a diameter of 20 mm and a thickness of 75 μm, an electrolyte, and other components. A propylene carbonate solution of triethylmethylammonium tetrafluoroborate [$(C_2H_5)_3CH_3NBF_4$] (1.8 M) was used as the electrolyte.

(Measurement of the Electrostatic Capacity of Activated Carbon)

Charge-discharge tests were performed by charging the capacitors for 120 minutes and discharging them for 20 minutes at a charge end-point electric potential of 2.7 V, a discharge end-point electric potential of 0 V, and a charging and discharging current of 5 mA; and the electrostatic capacities (F/cc) of the electric double-layer capacitors of Examples 27 to 29 and Comparative Examples 11 to 15 were calculated with the energy conversion method. The results obtained are shown in Table 9. Additionally shown in the table are the weight ratios [$W_2/W_1$] of the KOH and carbonaceous material in the mixtures of raw materials for the activated carbon, the types of mixtures, the pressures (MPa) applied when forming the molded product, the nickel contents (ppm) of the activated carbon, and the specific surface areas (m²/g).

TABLE 9

| Activated carbon | $W_2/W_1$ | Type of mixture | Pressure (MPa) | Electrostatic capacity (F/cc) | Ni Content (ppm) | Specific surface area (m²/g) |
|---|---|---|---|---|---|---|
| Example 26 | 1.9 | Molded Product | 20 | 33.2 | 0.2 | 807 |
| Example 27 | 1.9 | Molded Product | 5 | 33.4 | 0.1 | 801 |

TABLE 9-continued

| Activated carbon | $W_2/W_1$ | Type of mixture | Pressure (MPa) | Electrostatic capacity (F/cc) | Ni Content (ppm) | Specific surface area (m²/g) |
|---|---|---|---|---|---|---|
| Example 28 | 1.9 | Molded Product | 2 | 32.9 | 0.1 | 817 |
| Comparative Example 11 | 1.9 | Powder | — | 30.6 | 30 | 590 |
| Comparative Example 12 | 2.03 | Powder | — | 32.1 | 47 | 790 |
| Comparative Example 13 | 1.9 | Molded Product | 1.5 | 32.5 | 21 | 795 |
| Comparative Example 14 | 1.9 | Molded Product | 40 | 29 | 0.4 | Not measurable |
| Comparative Example 15 | 1.9 | Molded Product | 40 | 20.4 | 0.4 | Not measurable |

It is apparent from Table 9 that an activated carbon having high electrostatic capacity and minimal nickel content can be obtained (Examples 26 to 28) when using a molded product formed under a predetermined pressure. In this case, it is apparent that the specific surface area can be controlled to a substantially fixed value by adding conditions such as setting the ratio of both weights [$W_2/W_1$] to equivalent values.

In Comparative Examples 11 to 13, it is apparent that the nickel content is extremely high in comparison with Examples 26 and 28 due to melting of the powder mixture to adhering to the interior surface of the reactor made from pure nickel. In the case of Comparative Examples 14 and 15, so the specific surface areas could not be measured because activation did not sufficiently progress due to the high density caused by the high pressure and so on.

INDUSTRIAL APPLICABILITY

According to the first present invention, a method for manufacturing activated carbon in which carbonaceous material is subjected to alkali treatment and activated while kept in a solid state is provided. According to this manufacturing method, both the carbonaceous material and the alkali metal hydroxide can be handled in a solid state, so the method is extremely safe, and corrosion of an apparatus that occurs when manufacturing an alkali-activated carbon can be greatly reduced. Also, the metal content of the obtained activated carbon is minimal, so the electrostatic capacity is large and the chance of shorting can be reduced when the material is molded and fabricated into a polarizable electrode, and used in an electric double-layer capacitor.

In the first present invention, by satisfying a predetermined relationship between the pressure inside the treatment system and the temperature rise rate during dehydration treatment when activating carbonaceous material with an alkali to manufacture activated carbon, the mixture of carbonaceous material and alkali metal hydroxide can be subjected to dehydration treatment while kept in the solid state, and corrosion of a device due to the alkali can be greatly reduced. The carbonaceous material obtained from the dehydration treatment can be subjected to activation treatment to produce activated carbon, and can be advantageously used in catalysts, solvent recovery, water treatment, and as electric double-layer capacitors or other electrical materials, or the like.

In the first present invention, when inert gas circulated through the system in at least the activation step is brought into contact for 0.5 seconds or more with carbon material for sorption that has been heated to a temperature of 300 to 800° C., the alkali metal in vapor form that is generated when an activated carbonaceous material is activated with an alkali to manufacture activated carbon can be sorbed to the carbon material for sorption, making it possible to obtain activated carbon that is commercially advantageous and can be safely treated while avoiding the danger of ignition and explosions.

According to the second present invention, it is possible to manufacture activated carbon with an appropriate specific surface area as an electrode for an electric double-layer capacitor with a higher electrostatic capacity, in which the activation efficiency can also be improved by means of an alkali metal activator, the consumption thereof can be reduced, the specific surface area can be controlled, thereby resulting in a smaller quantity of impurities.

The invention claimed is:

1. A method for manufacturing an activated carbon, comprising:
    mixing a carbonaceous material and an alkali metal hydroxide while maintaining a solid state to obtain a mixture;
    granulating the mixture while maintaining a solid state to obtain a granulated product;
    dehydrating the granulated product while maintaining a solid state to obtain a dehydrated product; and
    subjecting the dehydrated product to an activation treatment to obtain the activated carbon,
    wherein the carbonaceous material comprises grains with a maximum length of 500 μm or less in the direction of the major axis.
2. The manufacturing method according to claim 1, wherein the temperature in said granulating is 80° C. or more.
3. The manufacturing method according to claim 1, wherein the maximum diameter of the granulated product is 50 mm or less.
4. The manufacturing method according to claim 1, wherein the temperature in said dehydrating is 200° C. or more.
5. The manufacturing method according to claim 1, wherein the pressure in said dehydrating is 0.01 to 10 Torr, and the temperature in said dehydrating is 200 to 400° C.
6. The manufacturing method according to claim 1, wherein the carbonaceous material is an easily graphitizable carbonaceous material.
7. The manufacturing method according to claim 1, wherein the carbonaceous material is a mesophase pitch carbon fiber.
8. The manufacturing method according to claim 1, wherein the alkali metal hydroxide has an average particle diameter of 1 mm or less.
9. The manufacturing method according to claim 1, wherein the alkali metal hydroxide is sodium hydroxide and/or potassium hydroxide.
10. The manufacturing method according to claim 1, wherein no less than 1 part by weight of alkali metal hydroxide is mixed with 1 part by weight of carbonaceous material in said mixing.
11. The manufacturing method according to claim 1, wherein the temperature in said activation treatment is 500° C. to 900° C.
12. The manufacturing method according to claim 1, further comprising adding a finely pulverized carbonaceous material to the alkali metal hydroxide prior to said mixing in an mount of 0.5 to 10 wt %.
13. The manufacturing method according to claim 12, wherein variation in the composition ratio of the alkali metal hydroxide relative to the carbonaceous material in the granulated and/or dehydrated product is 5% or less.

14. The manufacturing method according to claim 13, wherein variation in the composition ratio of the alkali metal hydroxide relative to the carbonaceous material is 2% or less.

15. The manufacturing method according to claim 1, wherein the rate at which the temperature is raised to 200 to 600° C. is 5° C./minute or less, and the holding time at a holding temperature of 700° C. or more is 0.5 to 8 hours in the activation treatment.

16. The manufacturing method according to claim 15, wherein the rate at which the temperature is raised to 200 to 600° C. is 2° C./minute or less.

17. The manufacturing method according to claim 15, wherein the holding time at a holding temperature of 700° C. or more is 1 to 6 hours.

18. The manufacturing method according to claim 15, wherein the holding temperature is 700 to 850° C.

19. The manufacturing method according to claim 15, wherein the activation treatment is performed in a rotary kiln.

20. The manufacturing method according to claim 19, wherein the activation treatment is a continuous process.

21. A method for manufacturing an activated carbon, comprising:
    mixing a carbonaceous material and an alkali metal hydroxide while maintaining a solid state to obtain a mixture;
    granulating the mixture while maintaining a solid state to obtain a granulated product;
    dehydrating the granulated product while maintaining a solid state to obtain a dehydrated product; and
    subjecting the dehydrated product to an activation treatment to obtain the activated carbon,
    wherein alkali metal in vapor form that is generated during activation treatment is sorbed to the activated carbon for sorption by circulating inert gas through the system in at least the activation treatment and contacting the circulating inert gas for 0.5 seconds or more with the activated carbon for sorption wherein the activated carbon has been heated to a temperature of 300 to 800° C.

22. The manufacturing method according to claim 21, wherein the circulating inert gas has a linear velocity of 1.0 to 10.0 mm/second.

23. A method for manufacturing an activated carbon, comprising:
    mixing a carbonaceous material and an alkali metal hydroxide while maintaining a solid state to obtain a mixture;
    granulating the mixture while maintaining a solid state to obtain a granulated product;
    dehydrating the granulated product while maintaining a solid state to obtain a dehydrated product; and
    subjecting the dehydrated product to an activation treatment to obtain the activated carbon,
    wherein the pressure in said granulating is 0.01 to 300 Torr, and the temperature in said granulating is 90 to 140° C.

24. A method for manufacturing an activated carbon, comprising:
    mixing a carbonaceous material and an alkali metal hydroxide while maintaining a solid state to obtain a mixture;
    granulating the mixture while maintaining a solid state to obtain a granulated product;
    dehydrating the granulated product while maintaining a solid state to obtain a dehydrated product; and
    subjecting the dehydrated product to an activation treatment to obtain the activated carbon,
    wherein during said dehydrating, the pressure and the temperature rise rate are set so as to satisfy the following equation (2), $$Pv < 15 \text{ Torr} \cdot °C./\text{minute} \tag{2}$$

wherein P is the pressure (Torr), and v is the temperature rise rate (° C./minute).

25. A method for manufacturing an activated carbon, comprising:
    mixing a carbonaceous material and an alkali metal hydroxide while maintaining a solid state to obtain a mixture;
    granulating the mixture while maintaining a solid state to obtain a granulated product;
    dehydrating the granulated product while maintaining a solid state to obtain a dehydrated product; and
    subjecting the dehydrated product to an activation treatment to obtain the activated carbon,
    wherein the carbonaceous material is a mesophase pitch carbon fiber and the mesophase pitch carbon fiber comprises 50 vol % or more of an optically anisotropic phase.

26. A method for manufacturing an activated carbon, comprising:
    mixing a carbonaceous material and an alkali metal hydroxide while maintaining a solid state to obtain a mixture;
    granulating the mixture while maintaining a solid state to obtain a granulated product;
    dehydrating the granulated product while maintaining a solid state to obtain a dehydrated product; and
    subjecting the dehydrated product to an activation treatment to obtain the activated carbon,
    wherein said granulating and said dehydrating are performed so as to satisfy the following equation (3), $$[A1/B1] \geq [A2/B2] \tag{3}$$

wherein A1 (N) is the crushing strength of the granulated product, B1 (cm) is the diameter of the granulated product, A2 (N) is the crushing strength of the dehydrated product, and B2 (cm) is the diameter of the dehydrated product.

27. A dehydration product for an activated carbon obtained by the process comprising
    mixing a carbonaceous material and an alkali metal hydroxide while maintaining a solid state to obtain a mixture,
    granulating the mixture while maintaining its solid state to obtain a granulated substance, and
    dehydrating the granulated substance while maintaining a solid state to obtain the dehydrated product;
    wherein said dehydrated product satisfies the following equation (1), $$[M1/C1]/[M2/C2] \leq 2.4 \tag{1}$$

where [M1/C1] is the alkali metal/carbon ratio in the surface layer region thereof, and [M2/C2] is the alkali metal/carbon ratio in the center portion thereof.

* * * * *